United States Patent
Morodome et al.

(10) Patent No.: US 12,528,834 B2
(45) Date of Patent: *Jan. 20, 2026

(54) METHOD FOR PRODUCING PEPTIDE COMPOUND

(71) Applicants: NISSAN CHEMICAL CORPORATION, Tokyo (JP); PEPTIDREAM INC., Kawasaki (JP)

(72) Inventors: Keisuke Morodome, Funabashi (JP); Michiharu Handa, Funabashi (JP)

(73) Assignees: NISSAN CHEMICAL CORPORATION, Tokyo (JP); PEPTIDREAM INC., Kawasaki (JP)

( * ) Notice: Subject to any disclaimer, the term of this patent is extended or adjusted under 35 U.S.C. 154(b) by 932 days.

This patent is subject to a terminal disclaimer.

(21) Appl. No.: 17/763,185

(22) PCT Filed: Sep. 14, 2020

(86) PCT No.: PCT/JP2020/034686
§ 371 (c)(1),
(2) Date: Mar. 23, 2022

(87) PCT Pub. No.: WO2021/060048
PCT Pub. Date: Apr. 1, 2021

(65) Prior Publication Data
US 2022/0372069 A1    Nov. 24, 2022

(30) Foreign Application Priority Data

Sep. 25, 2019 (JP) ................................. 2019-174364
Apr. 24, 2020 (JP) ................................. 2020-077224

(51) Int. Cl.
*C07K 1/10* (2006.01)
(52) U.S. Cl.
CPC ...................................... *C07K 1/10* (2013.01)
(58) Field of Classification Search
None
See application file for complete search history.

(56) References Cited

U.S. PATENT DOCUMENTS

| 5,712,367 A | 1/1998 | Bernard et al. |
| 6,489,479 B1 | 12/2002 | Karpf et al. |
| 12,240,871 B2 * | 3/2025 | Takeuchi ............ C07K 5/06147 |
| 2010/0280221 A1 * | 11/2010 | Callens ................ C07K 5/0819 530/331 |

FOREIGN PATENT DOCUMENTS

| JP | 2011-504175 A | 2/2011 |
| WO | WO 2012/004554 A1 | 1/2012 |
| WO | WO 2017/129796 A1 | 8/2017 |
| WO | WO 2020/111086 A1 | 6/2020 |

OTHER PUBLICATIONS

El-Faham et al., "Peptide Coupling Reagents, More than a Letter Soup," *Chem. Rev.*, 111(11): 6557-6602 (2011).
Martynova et al., "Structural-Functional Study of Glycine-and-Proline-Containing Peptides (Glyprolines) as Potential Neuroprotectors," *Russian J. Bioorg. Chem.*, 35(2): 150-156 (2009).
Spasova et al., "Synthesis of Kyotorphins Containing Non-Proteinogenic Amino Acids Involved in Arginine Pathway," *Bulgarian Academy of Science*, 57(11): 53-58 (2004).
Sperry et al., "Thermal Stability Assessment of Peptide Coupling Reagents Commonly Used in Pharmaceutical Manufacturing," *Org. Process. Res. Dev.*, 22(9): 1262-1275 (2018).
Japanese Patent Office, International Search Report in International Patent Application No. PCT/JP2020/034686 (Nov. 17, 2020).
European Patent Office, Extended European Search Report in European Patent Application No. 20870211.8 (Sep. 20, 2023).

* cited by examiner

*Primary Examiner* — Christina Bradley
(74) *Attorney, Agent, or Firm* — Leydig, Voit & Mayer, Ltd.

(57) ABSTRACT

An object of the present invention is to provide a method for producing a peptide with high efficiency, and a method for producing a peptide which comprises the following steps (1) and (2):
(1) a step of mixing an N-protected amino acid or an N-protected peptide with a carboxylic acid halide represented by the formula (I)

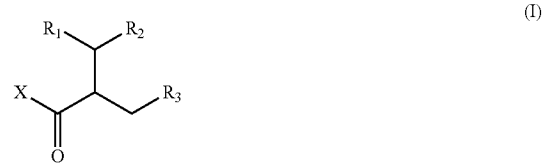

(wherein X represents a halogen atom,
$R^1$, $R^2$ and $R^3$ each independently represent an aliphatic hydrocarbon group which may have a substituent, and a total number of the carbon atoms in $R^1$, $R^2$ and $R^3$ is 3 to 40); and
(2) a step of mixing the product obtained in the step (1) and a C-protected amino acid or a C-protected peptide is provided.

20 Claims, No Drawings

METHOD FOR PRODUCING PEPTIDE COMPOUND

TECHNICAL FIELD

The present invention relates to a method for producing a peptide compound.

BACKGROUND ART

Condensing reagents for forming amide bonds are widely used in the production of physiologically active substances such as pharmaceuticals and pesticides.

In particular, in the production of a peptide compound, a plurality of amide bonds are required to be formed, so that a condensing reagent that can obtain an objective product with high yield is strongly desired (Non-Patent Document 1).

In the production of the peptide compounds, as a condensing reagent that can be industrially used, there have been known (1-cyano-2-ethoxy-2-oxoethylidene-aminooxy) dimethylamino-morpholino-carbenium hexafluorophosphate (COMU), isobutyl chloroformate, pivaloyl chloride, etc. (Patent Documents 1 and 2, and Non-Patent Documents 2 and 3). On the other hand, it has also been known that COMU and isobutyl chloroformate have exothermic properties due to self-decomposition (Non-Patent Document 4).

PRIOR ART DOCUMENTS

Patent Documents

Patent Document 1: WO 2017/129796
Patent Document 2: WO 2012/004554
Non-Patent Document 1: Chemical Reviews, 2011, vol. 111, pp. 6557-6602
Non-Patent Document 2: Bulgarian Academy of Science, 2004, vol. 57, pp. 53-58
Non-Patent Document 3: Russian Journal of Bioorganic Chemistry, 2009, vol. 35, pp. 150-156
Non-Patent Document 4: Organic Process Research and Development, 2018, vol. 22, pp. 1262-1275

SUMMARY OF THE INVENTION

Problems to be Solved by the Invention

As confirmed by the present inventors, when the N-terminal of the C-protected amino acid or the C-protected peptide and the C-terminal of the N-protected amino acid or the N-protected peptide were reacted using pivaloyl chloride as the condensing reagent, it was found that a by-product in which the pivaloyl group derived from the condensing reagent had been introduced into the N-terminal of the C-protected amino acid or the C-protected peptide was produced, so that the yield of the target peptide compound was lowered. In the production of the peptide compound in which the amide bonds are repeatedly formed, the above-mentioned by-products are accumulated as impurities. Therefore, the above-mentioned method is expected to have problems in terms of efficiency and economy as an industrial producing method.

The present invention is to provide a method for producing a peptide compound with high yield using a safe condensing reagent that does not generate heat due to self-decomposition.

Means to Solve the Problems

The present inventors have intensively studied and as a result, they have found that the above-mentioned problems can be solved by using a carboxylic acid halide having a specific structure, whereby the present invention has accomplished. That is, the present invention has the following characteristics.

[1]
A method for producing a peptide which comprises the following steps (1) and (2):
(1) a step of mixing an N-protected amino acid or an N-protected peptide with a carboxylic acid halide represented by the formula (I)

(wherein X represents a halogen atom,
$R^1$, $R^2$ and $R^3$ each independently represent an aliphatic hydrocarbon group which may have a substituent, and a total number of the carbon atoms in $R^1$, $R^2$ and $R^3$ is 3 to 40); and
(2)
a step of mixing the product obtained in the step (1) with a C-protected amino acid or a C-protected peptide.

[2]
The method for producing a peptide described in [1], which further comprises one or more repetitions of the following steps (3) to (5):
(3)
a step of removing a protective group for an N-terminal of the peptide obtained in the step (2) or (5);
(4)
a step of mixing an N-protected amino acid or an N-protected peptide with the carboxylic acid halide represented by the formula (I); and
(5)
a step of mixing the product obtained in the step (4) and the product obtained in the step (3).

[3]
The method for producing a peptide described in [1] or [2], wherein two or more among $R^1$, $R^2$ and $R^3$ are each independently an aliphatic hydrocarbon group containing one or more tertiary or quaternary carbon atoms.

[4]
The method for producing a peptide described in [1] or [2], wherein $R^1$ is a methyl group, and $R^2$ and $R^3$ are each independently an aliphatic hydrocarbon group containing one or more tertiary or quaternary carbon atoms.

[5]
The method for producing a peptide described in [4], wherein $R^2$ and $R^3$ are each independently a $C_{3-10}$ alkyl group containing one or more tertiary or quaternary carbon atoms.

[6]
The method for producing a peptide described in [1], wherein the carboxylic acid halide is a compound represented by the formula (II)

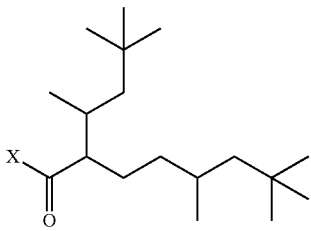

(II)

(wherein X represents a halogen atom).

[7]

The method for producing a peptide described in any one of [1] to [6], wherein X is a chlorine atom or a bromine atom.

[8]

The method for producing a peptide described in any one of [1] to [6], wherein X is a chlorine atom.

[9]

The method for producing a peptide described in any one of [1] to [8], wherein the amino acid of the N-protected amino acid is an α-amino acid other than glycine.

[10]

The method for producing a peptide described in [9], wherein the amino acid of the N-protected amino acid is an α-amino acid other than glycine, and the reactive functional group at a side chain of the amino acid is protected.

[11]

The method for producing a peptide described in [9] or [10], wherein the α-amino acid other than glycine is valine, phenylalanine, threonine, leucine, tryptophan, serine, cysteine, aspartic acid or tyrosine.

[12]

The method for producing a peptide described in any one of [1] to [11], wherein the amino acid at the C-protected amino acid or the amino acid at the N-terminal residue of the C-protected peptide is an α-amino acid other than the N-substituted amino acid.

[13]

The method for producing a peptide described in any one of [1] to [12], wherein the step (2) is a step of mixing the product obtained in the step (1) and a C-protected peptide.

[14]

The method for producing a peptide described in any one of [1] to [13], wherein the N-terminal protective group of the N-protected amino acid or the N-protected peptide is a carbamate-based protective group.

[15]

The method for producing a peptide described in [14], wherein the carbamate-based protective group is a 9-fluorenylmethyloxycarbonyl group or a benzyloxycarbonyl group.

Effects of the Invention

According to the present invention, the objective peptide could be obtained with high yield by using an industrially applicable reagent.

EMBODIMENTS TO CARRY OUT THE INVENTION

Hereinafter, the present invention will be explained in detail.

In the present specification, "n-" means normal, "s-" secondary, "t-" and "tert-" tertiary, "Me" methyl, "Et" ethyl, "Bu" butyl, "Bn" benzyl, "Boc" t-butoxycarbonyl, "Cbz" benzyloxycarbonyl, "Fmoc" 9-fluorenylmethoxycarbonyl, "Trt" trityl, and "NMP" N-methylpyrrolidone.

The term "halogen atom" means a fluorine atom, a chlorine atom, a bromine atom or an iodine atom.

The term "alkyl group" means a monovalent group of a linear or branched, saturated aliphatic hydrocarbon. The term "$C_{1-6}$ alkyl group" means a linear or branched alkyl group having 1 to 6 carbon atoms, and specific examples thereof include a methyl group, an ethyl group, an n-propyl group, an isopropyl group, an n-butyl group, an isobutyl group, an s-butyl group, a t-butyl group, an n-pentyl group, a 3-pentyl group, a 2-methylbutyl group, a 3-methylbutyl group, a 1,1-dimethylpropyl group, a 1,2-dimethylpropyl group, a 2,2-dimethylpropyl group, a 1-ethylpropyl group, an n-hexyl group, a 3,3-dimethylbutan-2-yl group, etc.

The term "$C_{1-40}$ alkyl group" means a linear or branched alkyl group having 1 to 40 carbon atoms, and specific examples thereof include a methyl group, an ethyl group, an n-propyl group, an isopropyl group, an n-butyl group, an isobutyl group, an s-butyl group, a t-butyl group, an n-pentyl group, an n-hexyl group, an octyl group, a decyl group, a dodecyl group, a hexadecyl group, an octadecyl group, a docosyl group, a triacontyl group, a tetracontyl group, a 3,7,11,15-tetramethylhexadecyl group (hereinafter, sometimes referred to as a 2,3-dihydrophytyl group), etc.

The term "$C_{3-10}$ alkyl group" means a linear or branched alkyl group having 3 to 10 carbon atoms, and specific examples thereof include an n-propyl group, an isopropyl group, an n-butyl group, an isobutyl group, an s-butyl group, a t-butyl group, an n-pentyl group, an n-hexyl group, an octyl group, a decyl group, a 2,3-dimethylbutyl group, a 2,2-dimethylbutyl group, a 2,2,4-trimethylpentyl group, a 2,2,4-trimethylhexyl group, a 2,2,3,4-tetramethylhexyl group, a 4-ethyl-2,2-dimethylhexyl group, etc.

The term "cycloalkyl group" means a monovalent group of a cyclic saturated aliphatic hydrocarbon. The term "$C_{3-6}$ cycloalkyl group" means a cycloalkyl group having 3 to 6 carbon atoms, and specific examples thereof include a cyclopropyl group, a cyclobutyl group, a cyclopentyl group, a cyclohexyl group, etc.

The term "alkenyl group" means a monovalent group of a linear or branched unsaturated aliphatic hydrocarbon having a double bond(s). The term "$C_{2-6}$ alkenyl group" means an alkenyl group having 2 to 6 carbon atoms, and specific examples thereof include a vinyl group, a 1-propenyl group, an allyl group, an isopropenyl group, a 2-butenyl group, a 3-butenyl group, etc.

The term "alkynyl group" means a monovalent group of a linear or branched unsaturated aliphatic hydrocarbon having a triple bond(s). The term "$C_{2-6}$ alkynyl group" means an alkynyl group having 2 to 6 carbon atoms, and specific examples thereof include an ethynyl group, a 1-propynyl group, etc.

The term "aralkyl group" means an alkyl group having an aromatic hydrocarbon(s) as a substituent(s). The term "$C_{7-14}$ aralkyl group" means an aralkyl group having 7 to 14 carbon atoms, and specific examples thereof include a benzyl group, a 1-phenylethyl group, a 2-phenylethyl group, a 1-phenylpropyl group, a naphthylmethyl group, a 1-naphthylethyl group, a 1-naphthylpropyl group, etc.

The term "$C_{6-14}$ aryl group" means an aromatic hydrocarbon group having 6 to 14 carbon atoms, and specific examples thereof include a phenyl group, a 1-anthryl group, a 2-naphthyl group, a 1-anthryl group, a 2-anthryl group, a 9-anthryl group, a biphenyl group, etc.

The term "$C_{6-14}$ haloaryl group" means an aromatic hydrocarbon group having 6 to 14 carbon atoms substituted by one or more halogen atoms, and specific examples thereof include a 4-chlorophenyl group, a 2,4-dichlorophenyl group, a 5-fluoro-1-naphthyl group, a 6-bromo-2-naphthyl group, a 6,7-diiodo-1-anthryl group, a 10-bromo-9-anthryl group, a 4'-chloro-(1,1'-biphenyl)-2-yl group, etc.

The term "$C_{6-14}$ aryloxy group" means an aryloxy group having 6 to 14 carbon atoms, and specific examples thereof include a phenoxy group, a 1-naphthyloxy group, a 2-naphthyloxy group, a 1-anthryloxy group, a 2-anthryoxy group, a 9-anthryoxy group, a biphenyloxy group, etc.

The term "5- to 10-membered heterocyclic group" means a monocyclic or fused cyclic heterocyclic group having a number of atoms constituting the ring of 5 to 10, and having 1 to 4 hetero atoms independently selected from the group consisting of a nitrogen atom, an oxygen atom and a sulfur atom in the atoms constituting the ring. This heterocyclic group may be either a saturated, partially unsaturated or unsaturated, and specific examples thereof include a pyrrolidinyl group, a tetrahydrofuryl group, a tetrahydrothienyl group, a piperidyl group, a tetrahydropyranyl group, a tetrahydrothiopyranyl group, a pyrrolyl group, a furyl group, a thienyl group, a pyridyl group, a pyrimidinyl group, a pyridazinyl group, an azepanyl group, an oxepanyl group, a thiepanyl group, an azepinyl group, an oxepinyl group, a thiepinyl group, an imidazolyl group, a pyrazolyl group, an oxazolyl group, a thiazolyl group, an imidazolinyl group, a pyradinyl group, a morpholinyl group, a thiazinyl group, an indolyl group, an isoindolyl group, a benzimidazolyl group, a purinyl group, a quinolyl group, an isoquinolyl group, a quinoxalinyl group, a cinnolinyl group, a pteridinyl group, a chromenyl group, an isochromenyl group, etc.

The term "$C_{1-6}$ alkoxy group" means a linear or branched alkoxy group having 1 to 6 carbon atoms, and specific examples thereof include a methoxy group, an ethoxy group, an n-propoxy group, an isopropoxy group, an n-butoxy group, an isobutoxy group, a t-butoxy group, an n-pentyloxy group, an n-hexyloxy group, etc.

The term "$C_{1-40}$ alkoxy group" means a linear or branched alkoxy group having 1 to 40 carbon atoms, and specific examples thereof include a methoxy group, an ethoxy group, an n-propoxy group, an isopropoxy group, an n-butoxy group, an isobutoxy group, a t-butoxy group, an n-pentyloxy group, an n-hexyloxy group, an octyloxy group, a decyloxy group, a dodecyloxy group, a hexadecyloxy group, an octadecyloxy group, a docosyloxy group, a triacontyloxy group, a tetracontyloxy group, a 3,7,11,15-tetramethylhexadecyloxy group (hereinafter, sometimes referred to as a 2,3-dihydrophytyloxy group), etc.

The term "$C_{3-6}$ cycloalkoxy group" means a cycloalkyloxy group having 3 to 6 carbon atoms, and specific examples thereof include a cyclopropoxy group, a cyclobutoxy group, a cyclopentyloxy group, a cyclohexyloxy group, etc.

The term "mono-$C_{1-6}$ alkylamino group" means a group in which one of the above-mentioned "$C_{1-6}$ alkyl groups" is bonded to an amino group, and specific examples thereof include a monomethylamino group, a monoethylamino group, a mono-n-propylamino group, a monoisopropylamino group, a mono-n-butylamino group, a monoisobutylamino group, a mono-t-butylamino group, a mono-n-pentylamino group, a mono-n-hexylamino group, etc.

The term "di-$C_{1-6}$ alkylamino group" means a group in which the same or different two of the above-mentioned "$C_{1-6}$ alkyl groups" are bonded to an amino group, and specific examples thereof include a dimethylamino group, a diethylamino group, a di-n-propylamino group, a diisopropylamino group, a di-n-butylamino group, a diisobutylamino group, a di-t-butylamino group, a di-n-pentylamino group, a di-n-hexylamino group, an N-ethyl-N-methylamino group, an N-methyl-N-n-propylamino group, an N-isopropyl-N-methylamino group, an N-n-butyl-N-methylamino group, an N-isobutyl-N-methylamino group, an N-t-butyl-N-methylamino group, an N-methyl-N-n-pentylamino group, an N-n-hexyl-N-methylamino group, an N-ethyl-N-n-propylamino group, an N-ethyl-N-isopropylamino group, an N-n-butyl-N-ethylamino group, an N-ethyl-N-isobutylamino group, an N-t-butyl-N-ethylamino group, an N-ethyl-N-n-pentylamino group, an N-ethyl-N-n-hexylamino group, etc.

The term "$C_{1-6}$ alkoxycarbonyl group" means a linear or branched alkoxycarbonyl group having 1 to 6 carbon atoms, and specific examples thereof include a methoxycarbonyl group, an ethoxycarbonyl group, an n-propoxycarbonyl group, an isopropoxycarbonyl group, an n-butoxycarbonyl group, an isobutoxycarbonyl group, a t-butoxycarbonyl group, an n-pentyloxycarbonyl group, an n-hexyloxycarbonyl group, etc.

The term "tri-$C_{1-6}$ alkylsilyl group" means a group in which the same or different three of the above-mentioned "$C_{1-6}$ alkyl groups" are bonded to a silyl group, and specific examples thereof include a trimethylsilyl (TMS) group, a triethylsilyl group, a triisopropylsilyl group, a t-butyldimethylsilyl group, a di-t-butylisobutylsilyl group, etc.

The term "tri-$C_{1-6}$ alkylsilyloxy group" means a group in which the same or different three of the above-mentioned "$C_{1-6}$ alkyl groups" are bonded to a silyloxy group, and specific examples thereof include a trimethylsilyloxy group, a triethylsilyloxy group, a triisopropylsilyloxy group, a t-butyldimethylsilyloxy group, a di-t-butylisobutylsilyloxy group, etc.

The term "bicycloalkyl group" means a monovalent group of a saturated aliphatic hydrocarbon containing two bridged carbons and having two rings, and specific examples thereof include an octahydroinden-3-yl group, an octahydronaphthalen-4-yl group, a bicyclo[2.2.1]heptan-1-yl group or bicyclo[2.2.1]heptan-2-yl group, etc. Also, the term "$C_{5-10}$ bicycloalkyl group" means a bicycloalkyl group having 5 to 10 carbon atoms, and the term "$C_{5-7}$ bicycloalkyl group" means a bicycloalkyl group having 5 to 7 carbon atoms.

The term "tricycloalkyl group" means a monovalent group of a saturated aliphatic hydrocarbon containing at least three bridged carbons and having three rings, and specific examples thereof include a tricyclo[3.3.1.1$^{3,7}$]decan-1-yl (adamantan-1-yl) group or a tricyclo[3.3.1.1$^{3,7}$]decan-2-yl (adamantan-2-yl) group, etc. Also, the term "$C_{5-15}$ tricycloalkyl group" means a tricycloalkyl group having 5 to 15 carbon atoms, and "$C_{7-15}$ tricycloalkyl group" mean a tricycloalkyl group having 7 to 15 carbon atoms.

The term "aliphatic hydrocarbon group" is a linear, branched or cyclic, saturated or unsaturated aliphatic hydrocarbon group, and there may be mentioned an alkyl group, a cycloalkyl group, an alkenyl group, an alkynyl group, an aralkyl group, etc., and specific examples thereof include a $C_{1-40}$ alkyl group, a $C_{3-6}$ cycloalkyl group, a $C_{2-6}$ alkenyl group, a $C_{2-6}$ alkynyl group, a $C_{7-14}$ aralkyl group, etc.

The term "aliphatic hydrocarbon group containing one or more tertiary or quaternary carbon atoms" means a group in which one or more among the carbon atoms constituting the aliphatic hydrocarbon group is/are a tertiary or quaternary carbon atom(s), and specific examples thereof include a 2-methylbutan-2-yl group, a 3-methylbutan-2-yl group, a 3,3-dimethylbutan-2-yl group, a t-butyl group, a 3-pentyl group, a 2,2,4-trimethylpentan-3-yl group, a 2,4,4-trimethylpentyl group, a 2,4-dimethylpentan-3-yl group, a 4-ethyl-2,2-dimethylhexan-3-yl group, a 3-heptyl group, a 2,2,4,8,10,10-hexamethylundecan-5-yl group, a 3-methylcyclobutyl group, a 2-methylcyclopentyl group, a 4-isopropylcyclohexyl group, etc.

The term "$C_{3-10}$ alkyl group containing one or more tertiary or quaternary carbon atoms" means a group in which one or more among the carbon atoms constituting the $C_{3-10}$ alkyl group is/are a tertiary or quaternary carbon atom(s), and specific examples thereof include an isobutyl group, a t-butyl group, an isopentyl group, a neopentyl group, a 2,2-dimethylbutyl group, a 2,3-dimethylbutyl group, a 2,2,4-trimethylpentyl group, a 2,4,4-trimethylpentyl group, a 2,2,4-trimethylhexyl group, a 2,2,3,4-tetramethylhexyl group, a 2,2,4,4-tetramethylpentyl group, a 4-ethyl-2,2-dimethylhexyl group, etc.

The term "reactive functional group of amino acid side chain" means a group that exists at a side chain of the amino acid and is capable of forming a covalent bond by reacting with the other group, and specific examples thereof include a hydroxy group, a carboxy group, an amino group, an amido group, a thiol group, etc. As the amino acid having these functional groups at the side chain, there may be mentioned arginine, asparagine, aspartic acid, lysine, glutamine, cysteine, serine, threonine, tyrosine, tryptophan, histidine, etc.

Also, the term "the reactive functional group at a side chain of the amino acid is protected" means that a protective group generally used in the peptide chemistry, etc., is introduced into the above-mentioned reactive functional group.

The term "which may have a substituent" means that it is unsubstituted, or substituted by an optional number of an optional substituent(s) that is chemically acceptable.

The term "which has a substituent" means that it is substituted by a chemically acceptable optional number of optional substituent(s).

The above-mentioned "optional substituent(s)" is not particularly limited in its kind as long as it is a substituent that does not exert any bad effect to the reaction to which the present invention is objected.

As the "substituent" in the "aliphatic hydrocarbon group which may have a substituent", there may be mentioned, for example, a $C_{6-14}$ aryl group, a $C_{6-14}$ aryloxy group, a 5-10 membered heterocyclic ring group, a hydroxy group, a $C_{1-40}$ alkoxy group, a $C_{3-6}$ cycloalkoxy group, an acetoxy group, a benzoyloxy group, an amino group, a mono-$C_{1-6}$ alkylamino group, an N-acetylamino group, a di-$C_{1-6}$ alkylamino group, a halogen atom, a $C_{1-6}$ alkoxycarbonyl group, a phenoxycarbonyl group, an N-methyl-carbamoyl group, an N-phenylcarbamoyl group, a tri-$C_{1-6}$ alkylsilyl group, a tri-$C_{1-6}$ alkylsilyloxy group, a cyano group, a nitro group, a carboxy group, etc.

The terms "N-protected amino acid" and "N-protected peptide" mean an amino acid or a peptide in which the amino group existing at the amino acid main chain or the amino group of the peptide N-terminal is protected, and the carboxy group existing at the amino acid main chain or the carboxy group at the peptide C-terminal is unprotected.

The terms "C-protected amino acid" and "C-protected peptide" mean an amino acid or a peptide in which the carboxy group existing at the amino acid main chain or the carboxy group at the peptide C-terminal is protected, and the amino group existing at the amino acid main chain or the amino group at the peptide N-terminal is unprotected.

In the amino acid used in the present invention, an N-substituted amino acid is also contained.

The term "N-substituted amino acid" means an amino acid in which one substituent is introduced into the amino group existing at the amino acid main chain, and specific examples thereof include an N—$C_{1-6}$ alkylamino acid, an N—$C_{2-6}$ alkenylamino acid, an N—$C_{2-6}$ alkynylamino acid, an N—$C_{6-14}$ arylamino acid, an N—$C_{1-6}$ alkoxyamino acid (the $C_{1-6}$ alkyl, $C_{2-6}$ alkenyl, $C_{2-6}$ alkynyl, $C_{6-14}$ aryl and $C_{1-6}$ alkoxy may have a substituent, and examples of such a substituent are the same as the examples of the "substituent" in the above-mentioned "aliphatic hydrocarbon group which may have a substituent"), etc.

The above-mentioned N—$C_{1-6}$ alkylamino acid is preferably an amino acid in which one $C_{1-6}$ alkyl group which may have a $C_{6-14}$ aryl group, a $C_{1-6}$ alkoxy group, a $C_{1-6}$ alkoxycarbonyl group, a di-$C_{1-6}$ alkylamino group, a 5- to 10-membered heterocyclic group or a tri-$C_{1-6}$ alkylsilyl group is introduced into the amino group, more preferably an amino acid in which one $C_{1-6}$ alkyl group which may have a $C_{6-14}$ aryl group, a $C_{1-6}$ alkoxy group or a $C_{1-6}$ alkoxycarbonyl group is introduced thereinto, and further preferably an amino acid into which one of a methyl group, an ethyl group, an n-propyl group, an n-butyl group or a benzyl group is introduced thereinto.

The "group derived from an amino acid" to be used in the present invention means a divalent group in which a hydrogen atom is removed from the nitrogen atom of the primary or secondary amino group existing at the main chain of the amino acid, and a hydroxy group is removed from the carboxy group existing at the main chain.

The "group derived from a peptide" to be used in the present invention means a divalent group in which a hydrogen atom is removed from the nitrogen atom of the primary or secondary amino group of the amino acid constituting the N-terminal, and a hydroxy group is removed from the carboxy group of the amino acid constituting the C-terminal.

The steric structure of the α-amino acid is not particularly limited, and it is preferably an L-isomer.

All technical terms and scientific terms used in the present specification have the same meanings as those commonly understood by those skilled in the art to which the present invention belongs. The same or equivalent optional method and material described in the present specification can be used in practice or experiment of the present invention, and preferable methods and materials are described below. All publications and patents referred to in the present specification are incorporated into the present specification by reference, for example, for the purpose of describing and disclosing the constructs and methodologies, which are described in the publications capable of using in connection with the described inventions.

(Specific Explanation of Producing Method of Peptide of Present Invention)

Hereinafter, the method for producing the peptide of the present invention can be carried out all the unit steps described as the respective steps (1) to (5) or in an appropriate combination thereof.

Incidentally, the present specific explanation is explained based on the following.
(a) $R^1$, $R^2$ and $R^3$ in the descriptions of the steps (1) to (5) have the same meanings as defined above.
(b) The specific conditions of the reaction are not particularly limited as long as the production of the peptide of the present invention is accomplished. Preferred conditions in the respective reactions are appropriately described in detail.

(c) The respective reactions can be carried out in a solvent, if necessary, and preferably carried out in a solvent. The solvent described in the respective reactions may be used alone or may be used in combination of two or more kinds.

Step (1)

The present step is a step of mixing an N-protected amino acid or an N-protected peptide with a carboxylic acid halide. The present step is a step of activating the C-terminal of the N-protected amino acid or the N-protected peptide with the carboxylic acid halide. In one embodiment of the present invention, this is a step of mixing the N-protected amino acid or the N-protected peptide represented by the formula (III): $P^1$-$A^1$-OH (wherein $P^1$ is an N-terminal protective group, and $A^1$ represents a group derived from an amino acid or a group derived from a peptide) with the carboxylic acid halide.

The carboxylic acid halide is represented by the following formula (I).

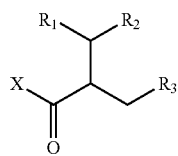

(I)

(wherein X represents a halogen atom, $R^1$, $R^2$ and $R^3$ each independently represent an aliphatic hydrocarbon group which may have a substituent, and a total number of the carbon atoms in $R^1$, $R^2$ and $R^3$ is 3 to 40.)

The carboxylic acid halide represented by the formula (I) is preferably a carboxylic acid halide in which two or more among $R^1$, $R^2$ and $R^3$ are each independently an aliphatic hydrocarbon group containing one or more tertiary or quaternary carbon atoms, more preferably a carboxylic acid halide in which $R^1$ is a methyl group, and $R^2$ and $R^3$ are each independently an aliphatic hydrocarbon group containing one or more tertiary or quaternary carbon atoms, further preferably a carboxylic acid halide in which $R^1$ is a methyl group, and $R^2$ and $R^3$ are each independently a $C_{3-10}$ alkyl group containing one or more tertiary or quaternary carbon atoms, and particularly preferably the compound represented by the following formula (II).

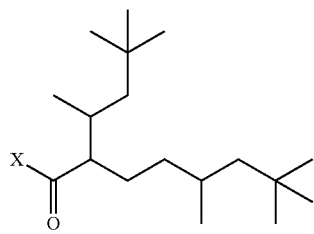

(II)

The halogen atom shown by X in the formula (I) and the formula (II) is not particularly limited as long as it is a halogen atom, and it is preferably a chlorine atom or a bromine atom, and more preferably a chlorine atom.

An amount of the carboxylic acid halide to be used is preferably 0.2 equivalent to 50 equivalents based on the amount of the N-protected amino acid or the N-protected peptide, more preferably 0.5 equivalent to 20 equivalents, and further preferably 0.8 equivalent to 5 equivalents.

The N-terminal protective group shown by $P^1$ of the formula (III) is not particularly limited, and specific examples thereof include a carbamate-based protective group (a 9-fluorenylmethoxycarbonyl group, a t-butoxycarbonyl group, a benzyloxycarbonyl group, an allyloxycarbonyl group, a 2,2,2-trichloroethoxycarbonyl group, a 2-(p-biphenyl)isopropyloxycarbonyl group, etc.), an amide-based protective group (an acetyl group, a trifluoroacetyl group, etc.), an imide-based protective group (phthaloyl group, etc.), a sulfonamide-based protective group (a p-toluenesulfonyl group, a 2-nitrobenzenesulfonyl group, etc.), a benzyl group, etc., preferably a 9-fluorenylmethoxycarbonyl group, a t-butoxycarbonyl group or a benzyloxy-carbonyl group, and more preferably a 9-fluorenylmethoxycarbonyl group or a benzyloxycarbonyl group.

The amino acid in the N-protected amino acid, and the amino acid in the C-terminal residue of the N-protected peptide shown by the formula (III) is not particularly limited, and preferably an α-amino acid, a β-amino acid, a γ-amino acid or a δ-amino acid, more preferably an α-amino acid or a p-amino acid, further preferably an α-amino acid, more further preferably an α-amino acid other than glycine, and particularly preferably valine, phenylalanine, threonine, leucine, tryptophan, serine, cysteine, aspartic acid or tyrosine. Incidentally, when two or more amino groups are present in these amino acids (for example, arginine, lysine, etc.), when two or more carboxy groups are present (for example, glutamic acid, aspartic acid, etc.), or when the reactive functional group is present (for example, cysteine, serine, etc.), the reactive functional group present at the side chain of the amino acid that is not participate in the formation of the peptide may be protected.

In the formula (III), when $A^1$ is a group derived from a peptide, a number of the amino acid residues contained in the group is not particularly limited, and is preferably 2 to 40, and more preferably 2 to 20.

The present step can be carried out by adding a base, if necessary.

The base used in the present step is not particularly limited, and examples thereof include an aliphatic amine (for example, triethylamine, N,N-diisopropyl-ethylamine, N-methylmorpholine), an aromatic amine (for example, pyridine, imidazole, N,N-dimethyl-4-aminopyridine), an amidine (for example, diazabicycloundecene), an alkali metal salt (for example, sodium hydrogen carbonate, potassium carbonate), etc. It is preferably an aliphatic amine, and more preferably N,N-diisopropylethylamine, triethylamine or N-methylmorpholine.

An amount of the base to be used in the present step is preferably 0.2 equivalent to 50 equivalents based on the amount of the carboxylic acid halide, more preferably 0.5 equivalent to 20 equivalents, and further preferably 0.8 equivalent to 5 equivalents.

The solvent used in the present step is not particularly limited as long as it does not interfere with the activation reaction, and examples thereof include a halogen-containing hydrocarbon solvent (for example, dichloromethane, chloroform), an aromatic hydrocarbon solvent (for example, toluene, xylene), an ether solvent (for example, tetrahydrofuran, 1,4-dioxane, cyclopentyl methyl ether, methyl-t-butyl ether), an amide solvent (for example, N,N-dimethylformamide, N,N-dimethylacetamide), a nitrile solvent (for example, acetonitrile), a ketone solvent (for example, acetone, methyl ethyl ketone), an aliphatic hydrocarbon solvent (for example, hexane, heptane, cyclohexane), an ester solvent (for example, ethyl acetate), etc. It is preferably a nitrile solvent, an amide solvent or an ether solvent, and more preferably acetonitrile, tetrahydrofuran or N,N-dimethylacetamide.

An amount of the solvent to be used is preferably 100-fold by mass or less based on the amount of the carboxylic acid halide, more preferably 1-fold by mass to 50-fold by mass, and further preferably 3-fold by mass to 20-fold by mass.

In the present step, the temperature may be controlled by using an oil bath or a cooling bath, if necessary, and the temperature is not particularly limited, and is preferably from −40° C. to the reflux temperature of the mixture, more preferably −20° C. to 50° C., and further preferably −10° C. to 30° C.

According to the present step, an N-protected amino acid or an N-protected peptide in which the C-terminal is activated is formed. Accordingly, the product obtained by the present step means an N-protected amino acid or an N-protected peptide in which the C-terminal is activated, or a mixture containing either of them. The N-protected amino acid or the N-protected peptide in which the C-terminal is activated thus obtained may be mixed with a C-protected peptide, as a reaction solution as such without subjecting to purification step, or isolated as a (crude) purified product.

Step (2)

The present step is a step of mixing the product obtained in the step (1) with a C-protected amino acid or a C-protected peptide. The present step is a step of mixing the N-protected amino acid or the N-protected peptide in which the C-terminal is activated obtained in the step (1), with a C-protected amino acid or a C-protected peptide. In one embodiment of the present invention, it is a step of mixing the N-protected amino acid or the N-protected peptide in which the C-terminal is activated obtained in the step (1), with the C-protected amino acid or the C-protected peptide represented by the formula (IV) H-$A^2$-$OP^2$ ($A^2$ represents a group derived from an amino acid or a group derived from a peptide, and $P^2$ is a C-terminal protective group).

The amino acid in the C-protected amino acid, and the amino acid in the N-terminal residue of the C-protected peptide represented by the formula (IV) is not particularly limited, and is preferably an α-amino acid, a β-amino acid, a γ-amino acid or a δ-amino acid, more preferably an α-amino acid or a p-amino acid, further preferably an α-amino acid, and more further preferably phenylalanine, glycine, valine, proline, leucine or ornithine. Incidentally, when two or more amino groups are present in these amino acids (for example, arginine, lysine, etc.), when two or more carboxy groups are present (for example, glutamic acid, aspartic acid, etc.), or when a reactive functional group is present (for example, cysteine, serine, etc.), the reactive functional group of the amino acid side chain which does not participate in the formation of the peptide may be protected.

In the formula (IV), when $A^2$ is a group derived from a peptide, a number of the amino acid residue contained in the group is not particularly limited, and is preferably 2 to 40, and more preferably 2 to 20.

The C-terminal protective group shown by $P^2$ in the formula (IV) is not particularly limited as long as it is a protective group generally used in the synthesis of an amino acid or a peptide and may be mentioned, for example, a methyl group, an ethyl group, a t-butyl group, a benzyl group, an allyl group, a silyl group, etc.

In the formula (IV), $P^2$ may be a group derived from a solid phase carrier, the embodiment is not particularly limited, and it binds directly or through a linker. The solid phase carrier is not particularly limited and may be mentioned, for example, synthetic resins such as nitrocellulose, agarose beads, modified cellulose fibers, polypropylene, polyethylene glycol, polystyrene and polyacrylamide, etc. The linker is not particularly limited and may be mentioned, for example, 2-chlorotrityl (2-ClTrt), 4-(hydroxymethyl) benzoic acid, 3,4-dihydro-2H-pyran-2-ylmethanol, 4-(hydroxy-methyl)phenoxyacetic acid, 3-hydroxy-xanthen-9-one, N-methoxy-β-aminopropionic acid, 3-methoxy-2-nitropyridine, etc.

The solvent used in the present step is not particularly limited, and examples thereof include a halogen-containing hydrocarbon solvent (for example, dichloromethane, chloroform), an aromatic hydrocarbon solvent (for example, toluene, xylene), an ether solvent (for example, tetrahydrofuran, 1,4-dioxane, cyclopentyl methyl ether, methyl-t-butyl ether), an amide solvent (for example, N,N-dimethylformamide), a nitrile solvent (for example, acetonitrile), etc. It is preferably a nitrile solvent, an amide solvent or an ether solvent, and more preferably acetonitrile, tetrahydrofuran or N,N-dimethylacetamide.

An amount of the solvent to be used is preferably 100-fold by mass or less based on the amount of the C-protected amino acid or the C-protected peptide, more preferably 1-fold by mass to 50-fold by mass, and further preferably 3-fold by mass to 20-fold by mass.

The obtained mixture is, if necessary, controlled its temperature using an oil bath or a cooling bath. A temperature of the mixture is not particularly limited, and is preferably −40° C. to a reflux temperature of the mixture, more preferably −20° C. to 50° C., and further preferably −10° C. to 30° C.

When the C-protected amino acid or the C-protected peptide used in the present step is a salt, it can be converted into a free form by adding an organic amine.

The organic amine used at the time of converting the salt of the C-protected amino acid or the C-protected peptide into a free form is not particularly limited, and examples thereof include an aliphatic amine (for example, dicyclohexylamine, piperidine, triethylamine, N,N-diisopropylethylamine, N-methylmorpholine), and an aromatic amine (for example, pyridine, imidazole, N,N-dimethyl-4-aminopyridine), etc.

It is preferably an aliphatic amine, and more preferably triethylamine or N,N-diisopropylethylamine.

An amount of the organic amine to be used at the time of converting the salt of the C-protected amino acid or the C-protected peptide into a free form is preferably 0.01 equivalent to 50 equivalents based on the amount of the C-protected amino acid or the C-protected peptide, more preferably 0.1 equivalent to 20 equivalents, and further preferably 0.2 equivalent to 5 equivalents.

Also, in the method for producing the peptide of the present invention, the peptide chain can be further extended by repeating the following steps (3) to (5) a desired number of times with regard to the peptide obtained in the step (2).

(3) A step of removing the protective group at the N-terminal of the peptide obtained in the step (2) or (5).
(4) A step of mixing an N-protected amino acid or an N-protected peptide with a carboxylic acid halide represented by the formula (I).
(5) A step of mixing the product obtained in the step (4) and the product obtained in the step (3).

The steps (4) and (5) can be carried out by the same operations as in the above-mentioned steps (1) and (2), respectively, or by a general peptide synthesis reaction.

The "N-protected amino acid or N-protected peptide" used in the step (4) may be the same as or different from that used in the step (1). Similarly, the "carboxylic acid halide represented by the formula (I)" used in the step (4) may be the same as or different from that used in the step (1).

In the method for producing the peptide of the present invention, it is possible to appropriately omit purification of the peptide obtained in the steps (1) to (5) as long as it does not affect the reaction of the next step.

Step (3)

The present step is a step of removing the N-terminal protective group from the peptide obtained in the step (2) or step (5).

The deprotection conditions used in the present step are appropriately selected depending on the kind of the N-terminal protective group and, for example, in the case of the 9-fluorenylmethoxycarbonyl group, it is carried out by treating with a secondary or tertiary amine (for example, pyrrolidine, piperidine, morpholine, triethylamine), in the case of the t-butoxycarbonyl group, it is carried out by treating with an acid (for example, trifluoroacetic acid, hydrochloric acid, Lewis acid), and in the case of the benzyloxycarbonyl group or the allyloxycarbonyl group, it is carried out at neutral, for example, by hydrogenation in the presence of a metal catalyst.

In each reaction, when the reaction substrate has a hydroxy group, a mercapto group, an amino group, a carboxy group or a carbonyl group (in particular, when it has a functional group at the side chain of the amino acid or the peptide), a protective group which has been generally used in the peptide chemistry, etc., may be introduced into these groups, and the objective compound can be obtained by removing the protective group after the reaction, if necessary.

Protection and deprotection can be carried out using a generally known protective group and subjecting to protection and deprotection reaction (for example, see Protective Group in Organic Synthesis, Fourth edition, written by T. W. Greene, John Wiley & Sons Inc. (2006), etc.).

EXAMPLES

Hereinafter, the present invention will be explained in more detail by referring to Reference Examples, Comparative Examples and Synthetic Examples as Examples, but the present invention is not limited to these Examples.

In the present specification, when the amino acid, etc., are indicated as an abbreviation, each indication is based on the abbreviation by IUPAC-IUB Commission on Biochemical Nomenclature or the conventional abbreviation in this field of the art.

In the present specification, 2-(4,4-dimethylpentan-2-yl)-5,7,7-trimethyloctanoyl group is sometimes referred to as ISTA, and the pivaloyl group as Piv.

Incidentally, in Synthetic Examples, "(v/v)" means (volume/volume), and "M" means mol/L.

Safety evaluation of ISTA-Cl and ISTA-Br was measured using a differential scanning calorimetry device manufactured by METTLER TOLED International Inc., under the <Measurement conditions> shown below.

<Measurement Conditions>
Temperature raising region: 30-300° C.
Temperature raising rate: 10° C./min
Used pan: Au pan M20 manufactured by Swiss Institute
High performance liquid chromatography/mass analysis was measured using, unless otherwise specifically mentioned, either of ACQUITY UPLC H-Class/QDa manufactured by Waters Corporation, ACQUITY UPLC H-Class/SQD2 manufactured by Waters Corporation, or LC-20AD/Triple Tof5600 manufactured by Shimadzu Corporation.

In the description of high performance liquid chromatography/mass analysis, ESI+ means a positive mode of the electrospray ionization method, and M+H means a proton adduct.

Hereinafter, unless otherwise specifically mentioned, the quantitative yields of each product and by-product were calculated by the analysis <Analytical conditions 1> using high performance liquid chromatography.

<Analytical Conditions 1>

High performance liquid chromatography: LC-20 manufactured by SHIMADZU
Column: Poroshell 120 EC-$C_{18}$ (2.7 m, 3.0×100 mm) manufactured by Agilent Column oven temperature: 40° C.
Eluent: 0.025 vol % trifluoroacetic acid, acetonitrile: 0.025 vol % trifluoroacetic acid aqueous solution
95:5 (0-12 min), 95:5 (12 min-18 min), 10:90 (18.1 min-23 min) (v/v)
Eluent speed: 0.7 mL/min
Detection wavelength: 210 nm Purification by silica gel column chromatography was carried out, unless otherwise specifically mentioned, either of Hi-Flash column manufactured by Yamazen Corporation, SNAP Ultra Silica Cartridge manufactured by Biotage AG, silica gel 60 manufactured by Merck or PSQ60B manufactured by Fuji Silysia Chemical Ltd., was used.

In the following Reference Examples and Examples, the yield or quantitative yield sometimes exceeds 100%. These are all exceeded 100% due to measurement error, the influence of the purity of the starting materials or the product, or other factors based on common general technical knowledge. In the following Examples, the causes when the yield exceeds 100% are not individually referred to, but those skilled in the art can fully understand the scientific validity of these Examples.

In the following Reference Examples and Synthetic Examples, there is a case where the quantitative yields of the objective product and the by-product are shown, and these are materials generating as a result of the reaction. Also, at the time of showing the quantitative yield, when the yield of the by-product is not specifically mentioned, it means that no by-product is generated.

Reference Example 1: Safety Evaluation by Differential Scanning Calorimetry of ISTA-Cl ISTA-Cl (16.8 mg) was charged in an Au pan, sealed, and calorimetric measurement was carried out. No exothermic peak was confirmed. According to this, it was clarified that ISTA-Cl did not have heat generation due to self-decomposition. Incidentally, the calorific values of COMU and isobutyl chloroformate are 773.17 J/g and 467.31 J/g, respectively (Non-Patent Document 4).

Reference Example 2: Safety Evaluation by Differential Scanning Calorimetry of ISTA-Br ISTA-Br (14.9 mg) was charged in an Au pan, sealed, and calorimetric measurement was carried out. No exothermic peak was confirmed. According to this, it was clarified that ISTA-Br did not have heat generation due to self-decomposition.

Reference Example 3: Synthesis of ISTA-Br

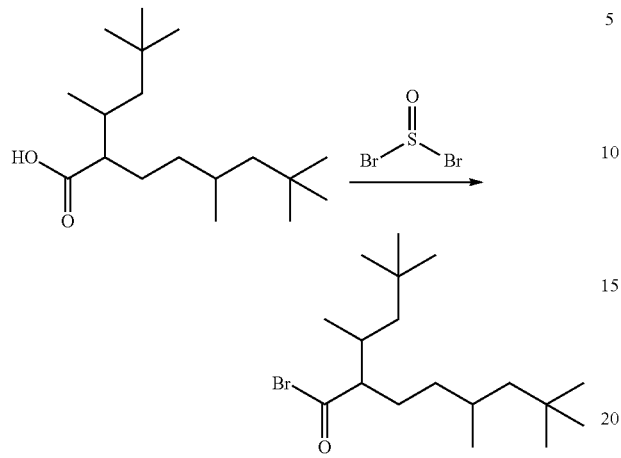

2-(4,4-Dimethylpentan-2-yl)-5,7,7-trimethyloctanoic acid (4.0 g, 14.06 mmol) and N,N-dimethylformamide (0.031 g, 0.422 mmol) were mixed with xylene (4.0 mL), thionyl bromide (4.8 g, 21.15 mmol) was added thereto at 0° C., and the temperature of the mixture was raised to room temperature and the mixture was stirred for one hour. The resulting reaction mixture was subjected to distillation under reduced pressure to obtain 2-(4,4-dimethylpentan-2-yl)-5,7,7-trimethyloctanoyl bromide (4.31 g, yield 88%) as a transparent liquid.

Reference Example 4: Synthesis of Fmoc-Val-Phe-OEt

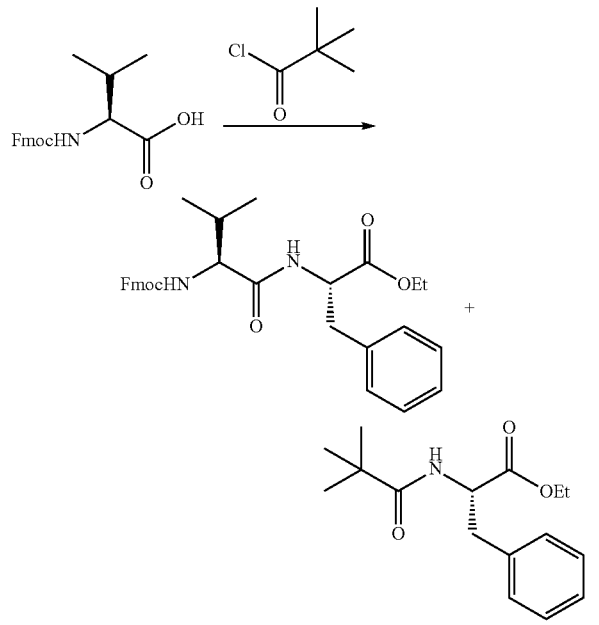

Fmoc-Val-OH (0.177 g, 0.522 mmol) and N,N-diisopropylethylamine (0.073 g, 0.566 mmol) were mixed with acetonitrile (1.8 mL), pivaloyl chloride (0.058 g, 0.479 mmol) was added thereto at 0° C. and the mixture was stirred for one hour. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Val-Phe-OEt (objective product) in the obtained organic layer was 79%, and the quantitative yield of Piv-Phe-OEt (by-product) was 21%.

Piv-Phe-OEt MASS (ESI+) m/z; 278.0 (M+H)+

Reference Example 5: Synthesis of Cbz-Val-Phe-OEt

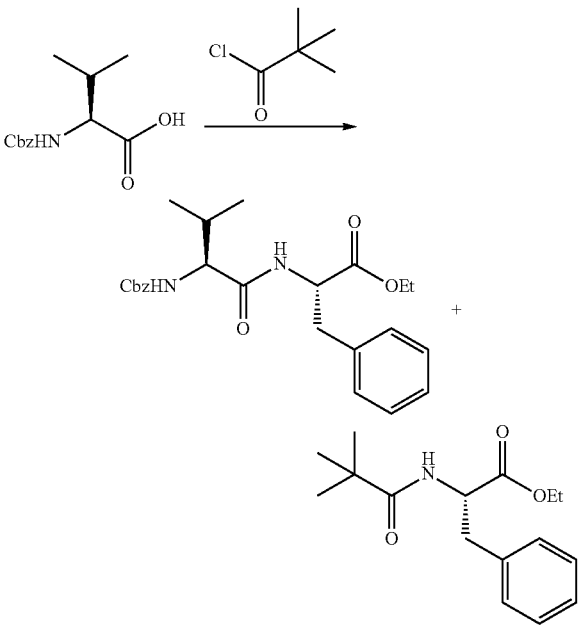

Cbz-Val-OH (0.131 g, 0.522 mmol) and N,N-diisopropylethylamine (0.073 g, 0.566 mmol) were mixed with acetonitrile (1.3 mL), then, pivaloyl chloride (0.058 g, 0.479 mmol) was added thereto at 0° C. and the mixture was stirred for one hour. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Cbz-Val-Phe-OEt (objective product) in the obtained organic layer was 77%, and the quantitative yield of Piv-Phe-OEt (by-product) was 22%.

Reference Example 6: Synthesis of Boc-Val-Phe-OEt

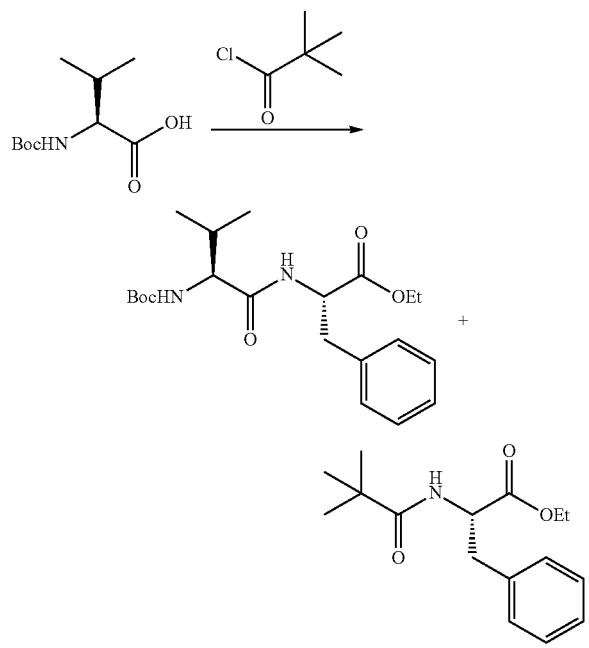

Boc-Val-OH (0.114 g, 0.522 mmol) and N,N-diisopropylethylamine (0.073 g, 0.566 mmol) were mixed with acetonitrile (1.1 mL), then, pivaloyl chloride (0.058 g, 0.479 mmol) was added thereto at 0° C. and the mixture was stirred for one hour. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Boc-Val-Phe-OEt (objective product) in the obtained organic layer was 79%, and the quantitative yield of Piv-Phe-OEt (by-product) was 18%.

Reference Example 7: Synthesis of Fmoc-Trp(Boc)-Ala-OBn

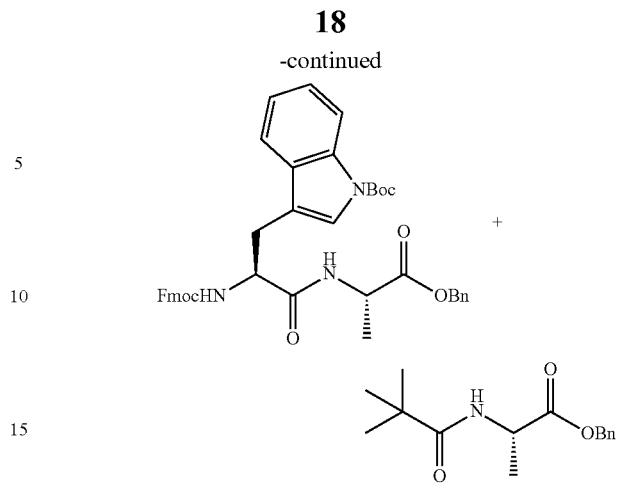

Fmoc-Trp(Boc)-OH (0.293 g, 0.556 mmol) and N,N-diisopropylethylamine (0.078 g, 0.602 mmol) were mixed with acetonitrile (2.9 mL), then, pivaloyl chloride (0.061 g, 0.509 mmol) was added thereto at 0° C. and the mixture was stirred for 2 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Trp(Boc)-Ala-OBn (objective product) in the obtained organic layer was 84%, and the quantitative yield of Piv-Ala-OBn (by-product) was 10%.

Piv-Ala-OBn MASS (ESI+) m/z; 264.9 (M+H)+

Reference Example 8: Synthesis of Fmoc-Val-Phe-Phe-OEt

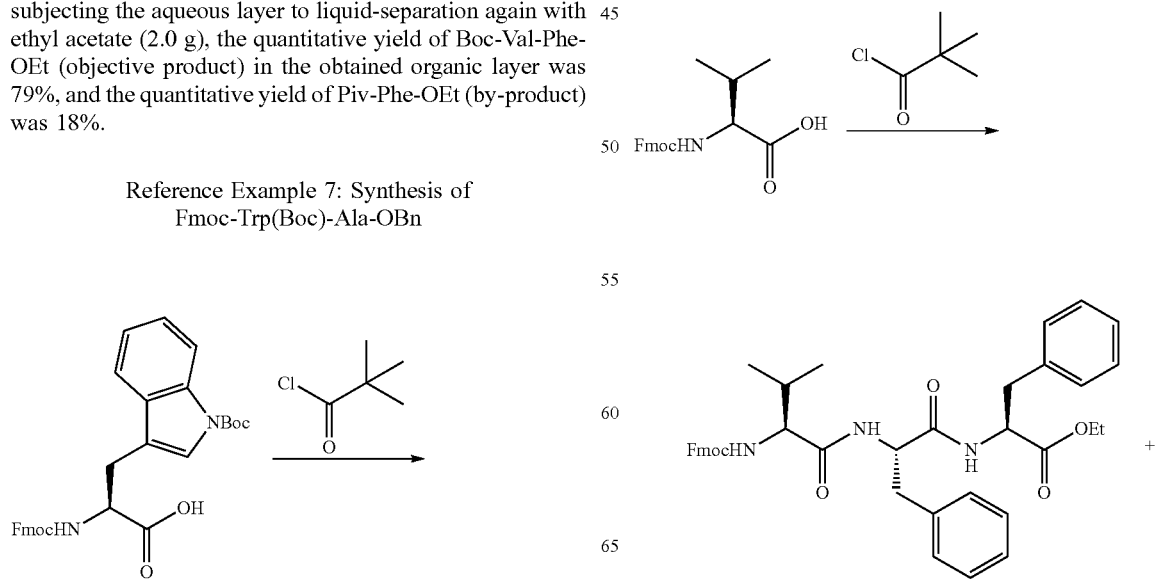

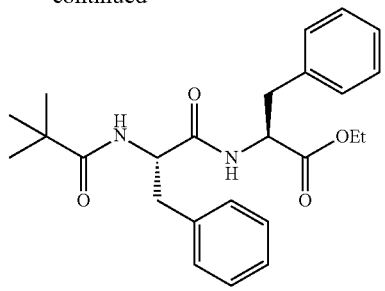

Fmoc-Val-OH (0.118 g, 0.348 mmol) and N,N-diisopropylethylamine (0.048 g, 0.377 mmol) were mixed with acetonitrile (1.2 mL), then, pivaloyl chloride (0.039 g, 0.32 mmol) was added thereto at 0° C. and the mixture was stirred for one hour. To the solution was added a solution prepared separately by mixing HCl·H-Phe-Phe-OEt (0.1 g, 0.29 mmol), N,N-diisopropylethylamine (0.045 g, 0.348 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (3.0 g), the quantitative yield of Fmoc-Val-Phe-Phe-OEt (objective product) in the obtained organic layer was 85%, and the quantitative yield of Piv-Phe-Phe-OEt (by-product) was 18%.

Piv-Phe-Phe-OEt MASS (ESI+) m/z; 425.2 (M+H)+

Reference Example 9: Synthesis of Fmoc-Trp(Boc)-Ala-Phe-OEt

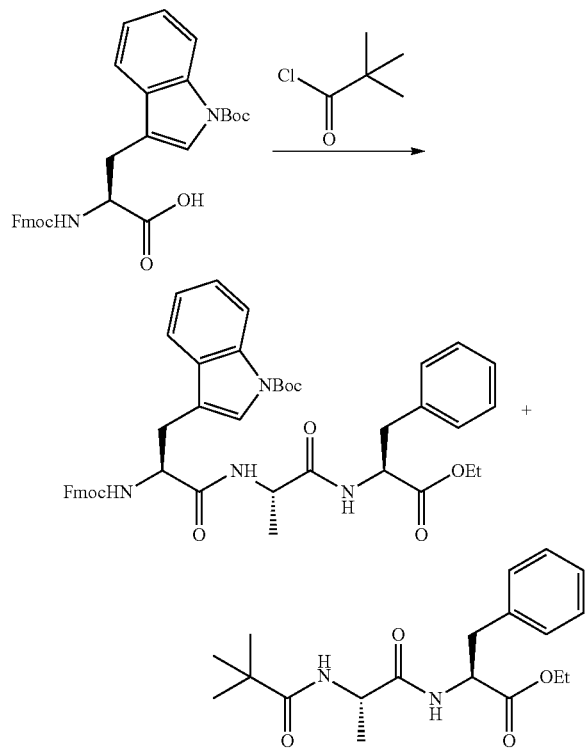

Fmoc-Trp(Boc)-OH (0.209 g, 0.40 mmol) and N,N-diisopropylethylamine (0.055 g, 0.43 mmol) were mixed with acetonitrile (2.1 mL), then, pivaloyl chloride (0.044 g, 0.36 mmol) was added thereto at 0° C. and the mixture was stirred for one hour. To the solution was added a solution prepared separately by mixing HCl·H-Ala-Phe-OEt (0.1 g, 0.33 mmol), N,N-diisopropylethylamine (0.051 g, 0.40 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (3.0 g), the quantitative yield of Fmoc-Trp(Boc)-Ala-Phe-OEt (objective product) in the obtained organic layer was 69%, and the quantitative yield of Piv-Ala-Phe-OEt (by-product) was 26%.

Piv-Ala-Phe-OEt MASS (ESI+) m/z; 349.1 (M+H)+

Synthetic Example 1: Synthesis of Fmoc-Val-Phe-OEt

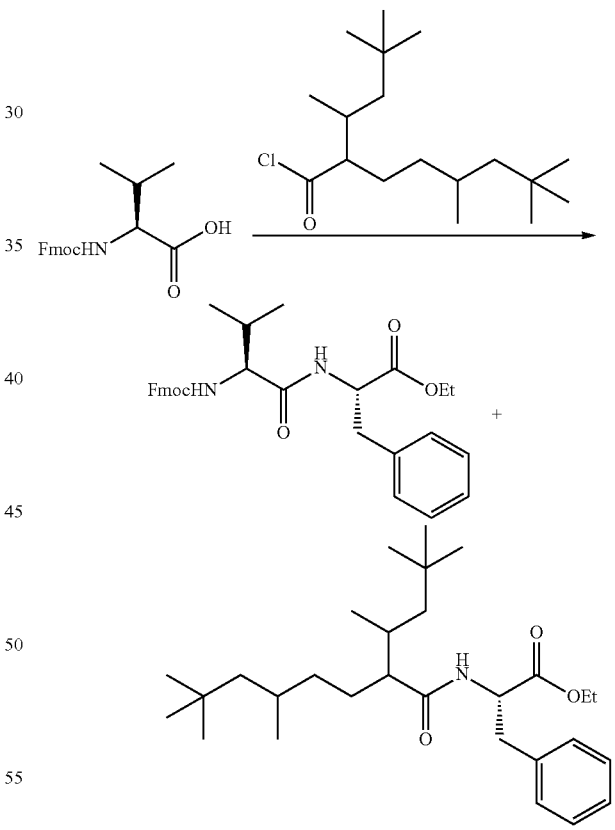

Fmoc-Val-OH (0.177 g, 0.522 mmol) and N,N-diisopropylethylamine (0.073 g, 0.566 mmol) were mixed with acetonitrile (1.8 mL), then, a 50% by mass toluene solution (0.29 g, 0.479 mmol) of 2-(4,4-dimethylpentan-2-yl)-5,7,7-trimethyl-octanoyl chloride (ISTA-Cl) was added thereto at 0° C. and the mixture was stirred for 2 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Val-Phe-OEt (objective product) in the obtained organic layer was 95%, and the quantitative yield of ISTA-Phe-OEt (by-product) was 1%.

Fmoc-Val-Phe-OEt MASS (ESI+) m/z; 515.7 (M+H)+
ISTA-Phe-OEt MASS (ESI+) m/z; 461.1 (M+H)+

Synthetic Example 2: Synthesis of Fmoc-Val-Phe-OEt

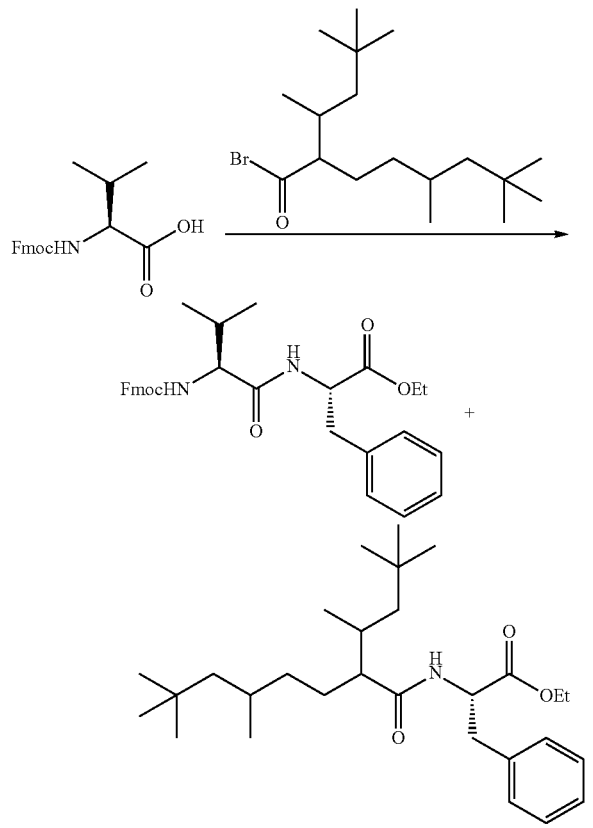

Fmoc-Val-OH (0.207 g, 0.610 mmol) and N,N-diisopropylethylamine (0.084 g, 0.650 mmol) were mixed with acetonitrile (1 mL), then, a solution prepared separately by mixing 2-(4,4-dimethylpentan-2-yl)-5,7,7-trimethyloctanoyl bromide (ISTA-Br) (0.197 g, 0.566) and toluene (0.197 g) had been mixed was added thereto at 0° C. and the mixture was stirred for one hour. To the reaction solution was added a solution prepared separately by mixing HCl·H-Phe-OEt (0.1 g, 0.435 mmol), N,N-diisopropylethylamine (0.068 g, 0.526 mmol) and acetonitrile (1.0 mL), and the resulting mixture was stirred for one hour. After diluting the obtained reaction mixture with tetrahydrofuran (3.0 g) and ethyl acetate (6.0 g), 10% by mass aqueous potassium hydrogen sulfate solution (1.0 g) and water (2.0 g) were added thereto and liquid-separation was carried out. After subjecting the aqueous layer to liquid-separation again with ethyl acetate (3.0 g), the quantitative yield of Fmoc-Val-Phe-OEt (objective product) in the obtained organic layer was 94%, and the quantitative yield of ISTA-Phe-OEt (by-product) was 1%.

Fmoc-Val-Phe-OEt MASS (ESI+) m/z; 515.7 (M+H)+
ISTA-Phe-OEt MASS (ESI+) m/z; 461.1 (M+H)+

Synthetic Example 3: Synthesis of Cbz-Val-Phe-OEt

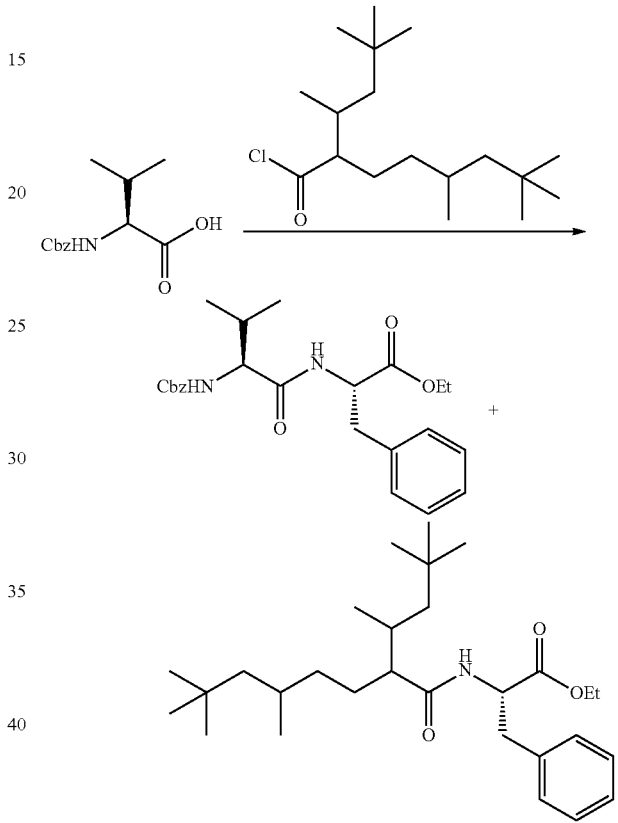

Cbz-Val-OH (0.131 g, 0.522 mmol) and N,N-diisopropylethylamine (0.073 g, 0.566 mmol) were mixed with acetonitrile (1.3 mL), then, a 50% by mass toluene solution (0.29 g, 0.479 mmol) of ISTA-Cl was added thereto at 0° C. and the mixture was stirred for 2 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Cbz-Val-Phe-OEt (objective product) in the obtained organic layer was 95%, and the quantitative yield of ISTA-Phe-OEt (by-product) was 1%.

Cbz-Val-Phe-OEt MASS (ESI+) m/z; 427.6 (M+H)+

Synthetic Example 4: Synthesis of Boc-Val-Phe-OEt

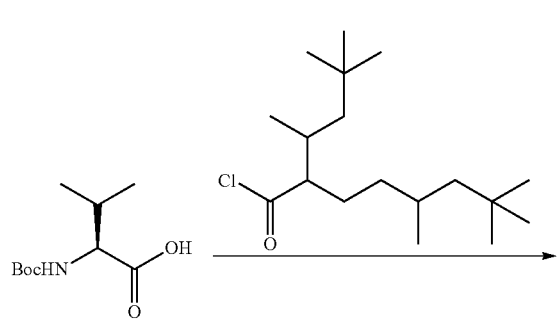

Boc-Val-OH (0.114 g, 0.522 mmol) and N,N-diisopropylethylamine (0.073 g, 0.566 mmol) were mixed with acetonitrile (1.1 mL), then, a 50% by mass toluene solution (0.29 g, 0.479 mmol) of ISTA-Cl was added thereto at 0° C. and the mixture was stirred for 2 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Boc-Val-Phe-OEt (objective product) in the obtained organic layer was 96%, and the quantitative yield of ISTA-Phe-OEt (by-product) was 1%.

Boc-Val-Phe-OEt MASS (ESI+) m/z; 393.5 (M+H)+

Synthetic Example 5: Synthesis of Fmoc-Phe-Phe-OEt

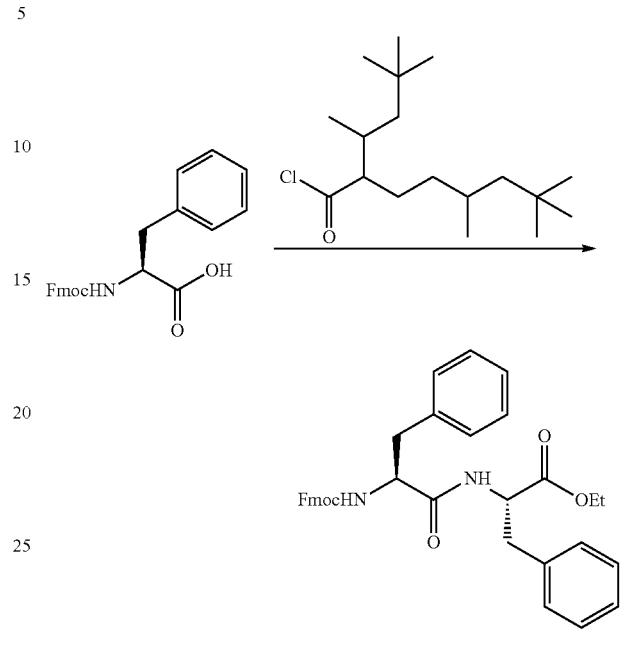

Fmoc-Phe-OH (0.202 g, 0.522 mmol) and N,N-diisopropylethylamine (0.073 g, 0.566 mmol) were mixed with acetonitrile (2.0 mL), then, a 50% by mass toluene solution (0.29 g, 0.479 mmol) of ISTA-Cl was added thereto at 0° C. and the mixture was stirred for 2 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Phe-Phe-OEt (objective product) in the obtained organic layer was 101%.

Fmoc-Phe-Phe-OEt MASS (ESI+) m/z; 563.6 (M+H)+

Synthetic Example 6: Synthesis of Cbz-Phe-Phe-OEt

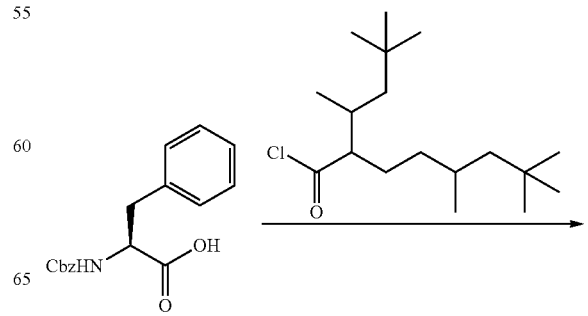

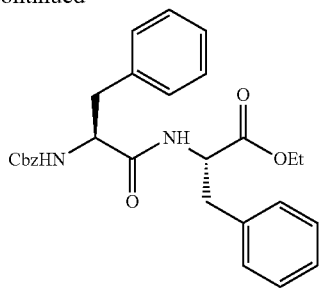

Cbz-Phe-OH (0.156 g, 0.522 mmol) and N,N-diisopropylethylamine (0.073 g, 0.566 mmol) were mixed with acetonitrile (1.6 mL), then, a 50% by mass toluene solution (0.29 g, 0.479 mmol) of ISTA-Cl was added thereto at 0° C. and the mixture was stirred for 2 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Cbz-Phe-Phe-OEt (objective product) in the obtained organic layer was 99%.

Cbz-Phe-Phe-OEt MASS (ESI+) m/z; 563.6 (M+H)+

Synthetic Example 7: Synthesis of Fmoc-Phe-MePhe-OMe

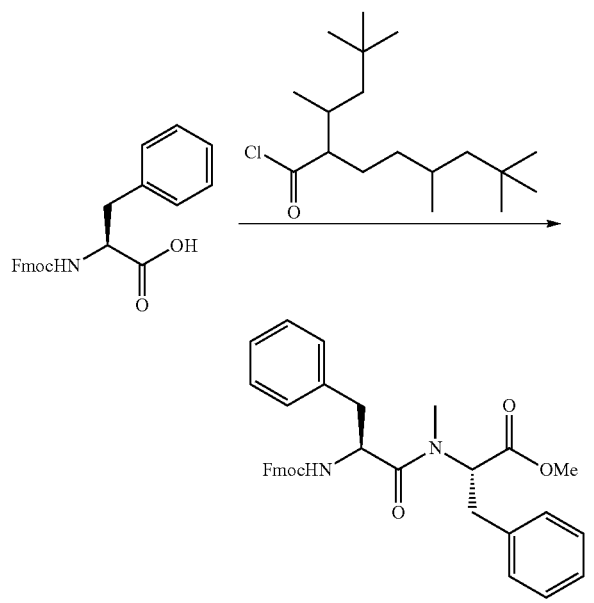

Fmoc-Phe-OH (0.202 g, 0.522 mmol) and N,N-diisopropylethylamine (0.073 g, 0.566 mmol) were mixed with acetonitrile (2.0 mL), then, a 50% by mass toluene solution (0.29 g, 0.479 mmol) of ISTA-Cl was added thereto at 0° C. and the mixture was stirred for 2 hours. To the solution was added a solution prepared separately by mixing HCl·H-MePhe-OMe (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Phe-MePhe-OMe (objective product) in the obtained organic layer was 91%.

Fmoc-Phe-MePhe-OMe MASS (ESI+) m/z; 563.7 (M+H)+

Synthetic Example 8: Synthesis of Fmoc-Leu-Gly-OBn

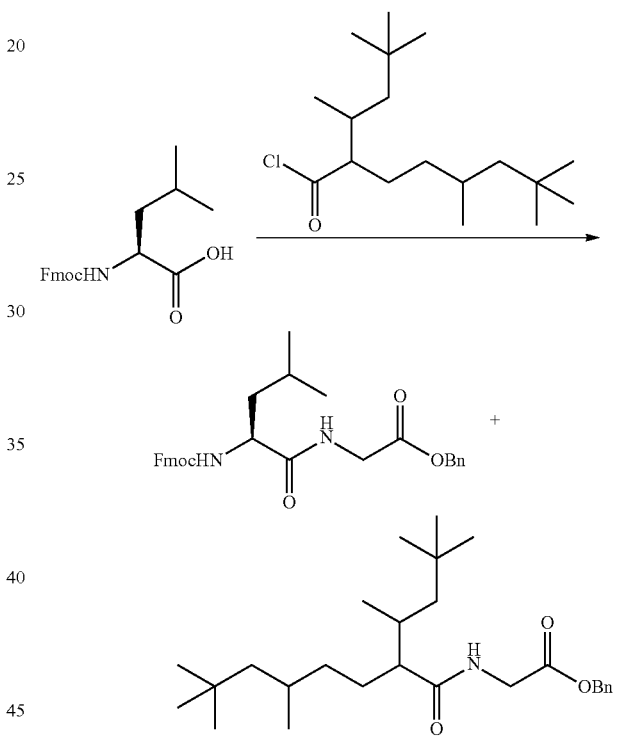

Fmoc-Leu-OH (0.210 g, 0.60 mmol) and N,N-diisopropylethylamine (0.083 g, 0.65 mmol) were mixed with acetonitrile (2.1 mL), then, a 50% by mass toluene solution (0.330 g, 0.55 mmol) of ISTA-Cl was added thereto at 0° C. and the mixture was stirred for 2 hours. To the solution was added a solution prepared separately by mixing HCl·H-Gly-OBn (0.1 g, 0.50 mmol), N,N-diisopropylethylamine (0.077 g, 0.60 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Leu-Gly-OBn (objective product) in the obtained organic layer was 98%, and the quantitative yield of Piv-Gly-OBn (by-product) was 1%.

Fmoc-Leu-Gly-OBn MASS (ESI+) m/z; 501.6 (M+H)+

ISTA-Gly-OBn MASS (ESI+) m/z; 432.7 (M+H)+

Synthetic Example 9: Synthesis of Fmoc-Trp(Boc)-Gly-OBn

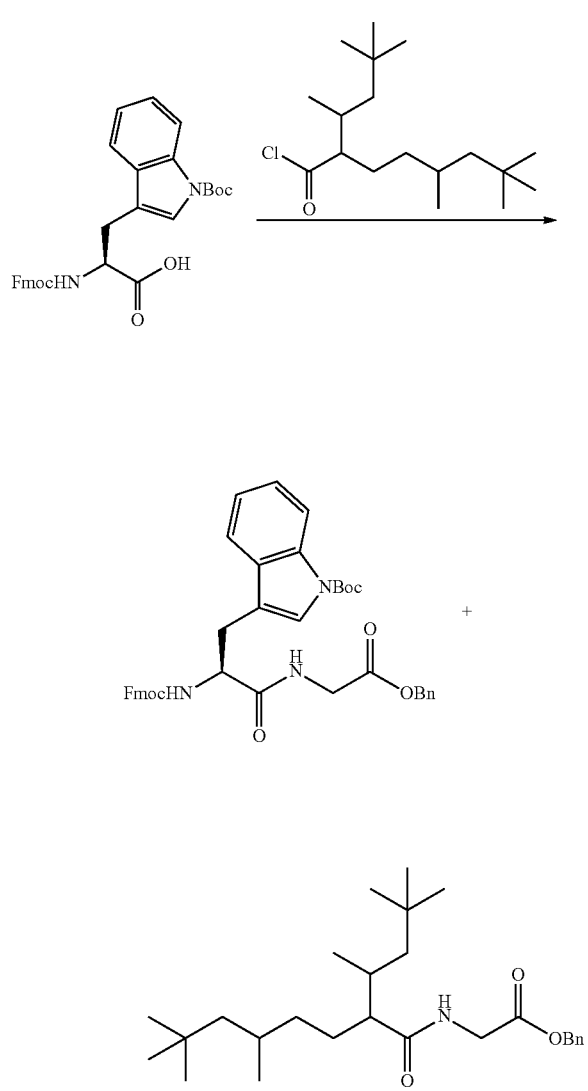

Fmoc-Trp(Boc)-OH (0.313 g, 0.60 mmol) and N,N-diisopropylethylamine (0.083 g, 0.65 mmol) were mixed with acetonitrile (3.1 mL), then, a 50% by mass toluene solution (0.330 g, 0.55 mmol) of ISTA-Cl was added thereto at 0° C. and the mixture was stirred for 3 hours. To the solution was added a solution prepared separately by mixing HCl·H-Gly-OBn (0.1 g, 0.50 mmol), N,N-diisopropylethylamine (0.077 g, 0.60 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Trp(Boc)-Gly-OBn (objective product) in the obtained organic layer was 93%, and the quantitative yield of ISTA-Gly-OBn (by-product) was 2%.

Fmoc-Trp-Gly-OBn MASS (ESI+) m/z; 574.3 (M+H)+ (detected as de-Boc body)

Synthetic Example 10: Synthesis of Fmoc-Leu-Ala-OBn

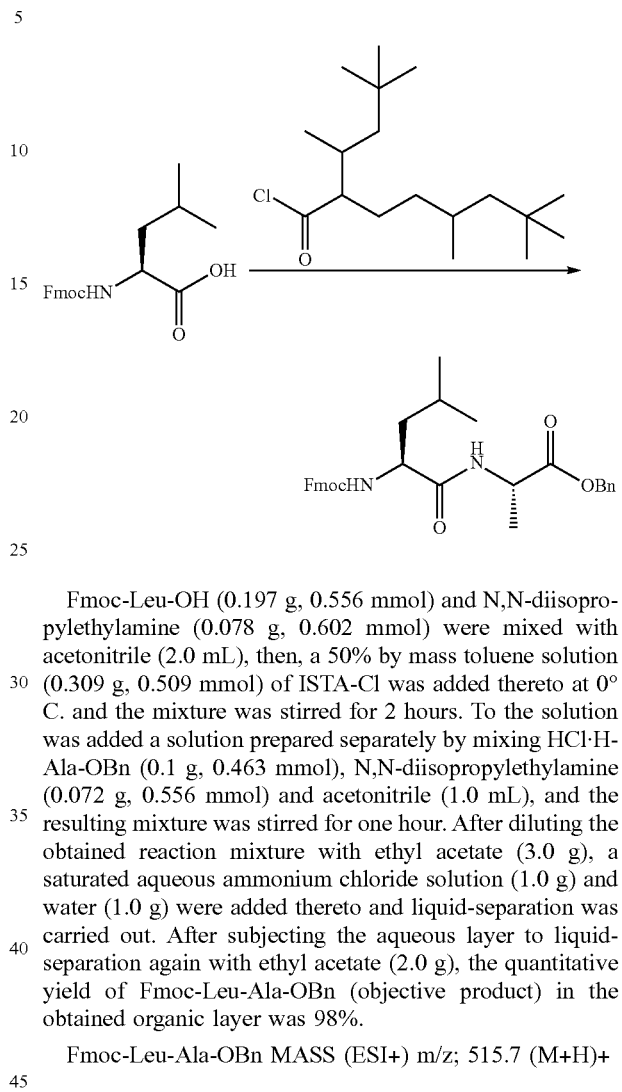

Fmoc-Leu-OH (0.197 g, 0.556 mmol) and N,N-diisopropylethylamine (0.078 g, 0.602 mmol) were mixed with acetonitrile (2.0 mL), then, a 50% by mass toluene solution (0.309 g, 0.509 mmol) of ISTA-Cl was added thereto at 0° C. and the mixture was stirred for 2 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Leu-Ala-OBn (objective product) in the obtained organic layer was 98%.

Fmoc-Leu-Ala-OBn MASS (ESI+) m/z; 515.7 (M+H)+

Synthetic Example 11: Synthesis of Fmoc-Trp(Boc)-Ala-OBn

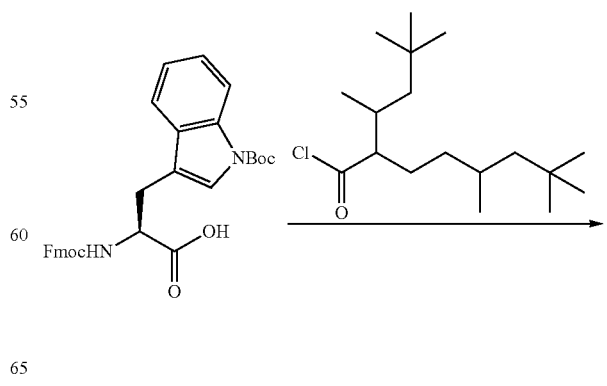

-continued

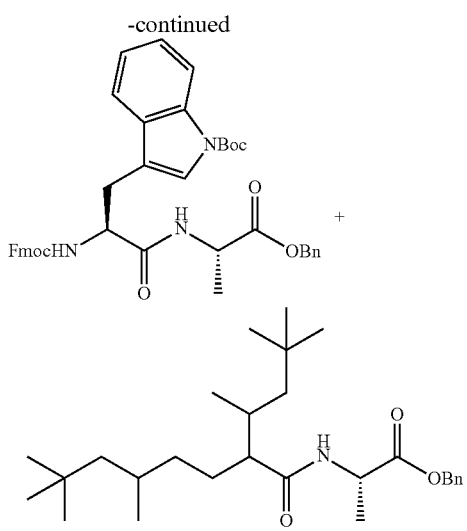

Fmoc-Trp(Boc)-OH (0.293 g, 0.556 mmol) and N,N-diisopropylethylamine (0.078 g, 0.602 mmol) were mixed with acetonitrile (2.9 mL), then, a 50% by mass toluene solution (0.309 g, 0.509 mmol) of ISTA-Cl was added thereto at 0° C. and the mixture was stirred for 3 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Trp(Boc)-Ala-OBn (objective product) in the obtained organic layer was 96%, and the quantitative yield of ISTA-Ala-OBn (by-product) was 1%.

Fmoc-Trp(Boc)-Ala-OBn MASS (ESI+) m/z; 688.4 (M+H)+

ISTA-Ala-OBn MASS (ESI+) m/z; 446.3 (M+H)+

Synthetic Example 12: Synthesis of Fmoc-Ser(tBu)-Ala-OBn

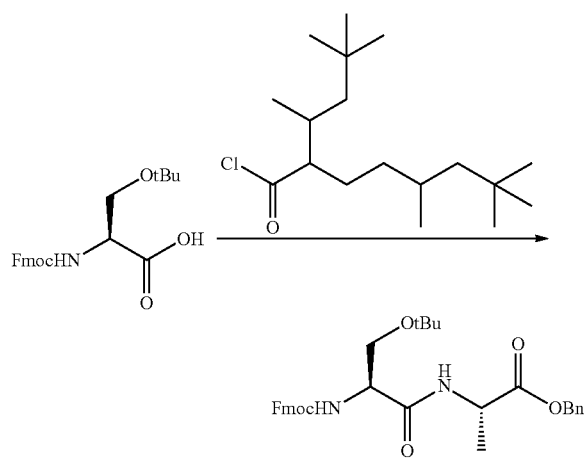

Fmoc-Ser(tBu)-OH (0.213 g, 0.556 mmol) and N,N-diisopropylethylamine (0.078 g, 0.602 mmol) were mixed with acetonitrile (2.1 mL), then, a 50% by mass toluene solution (0.309 g, 0.509 mmol) of ISTA-Cl was added thereto at 0° C. and the mixture was stirred for 2 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Ser(tBu)-Ala-OBn (objective product) in the obtained organic layer was 97%.

Fmoc-Ser(tBu)-Ala-OBn MASS (ESI+) m/z; 545.3 (M+H)+

Synthetic Example 13: Synthesis of Fmoc-Cys(Trt)-Ala-OBn

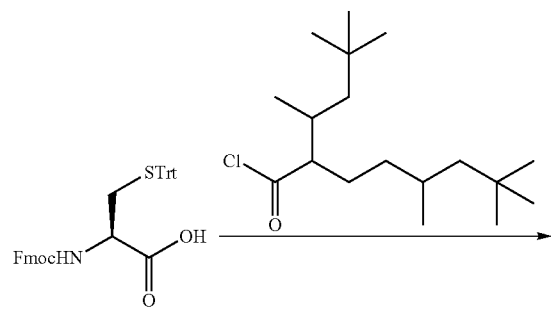

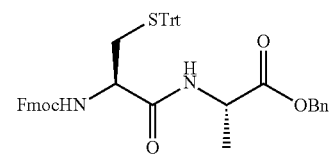

Fmoc-Cys(Trt)-OH (0.326 g, 0.556 mmol) and N,N-diisopropylethylamine (0.078 g, 0.602 mmol) were mixed with acetonitrile (3.3 mL), then, a 50% by mass toluene solution (0.309 g, 0.509 mmol) of ISTA-Cl was added thereto at 0° C. and the mixture was stirred for 2 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Cys(Trt)-Ala-OBn (objective product) in the obtained organic layer was 96%.

Synthetic Example 14: Synthesis of Fmoc-Thr(tBu)-Ala-OBn

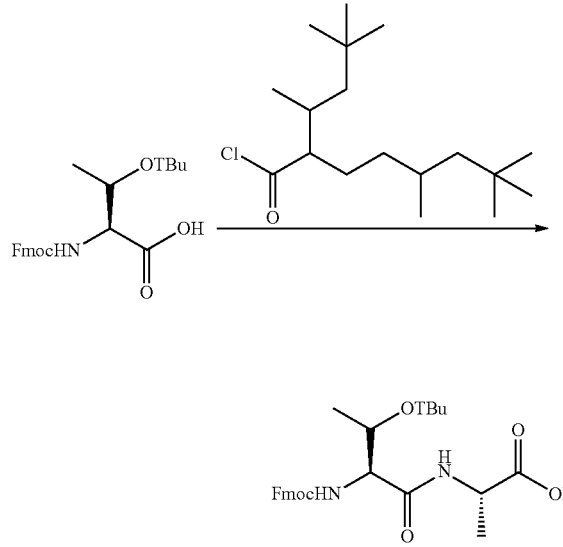

Fmoc-Thr(tBu)-OH (0.221 g, 0.556 mmol) and N,N-diisopropylethylamine (0.078 g, 0.602 mmol) were mixed with acetonitrile (2.2 mL), then, a 50% by mass toluene solution (0.309 g, 0.509 mmol) of ISTA-Cl was added thereto at 0° C. and the mixture was stirred for 2 hours. To the solution was added a solution prepared separately by mixing HCl·H-Ala-OBn (0.1 g, 0.463 mmol), N,N-diisopropylethylamine (0.072 g, 0.556 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Thr(tBu)-Ala-OBn (objective product) in the obtained organic layer was 92%.

Fmoc-Thr(tBu)-Ala-OBn MASS (ESI+) m/z; 559.4 (M+H)+

Synthetic Example 15: Synthesis of Fmoc-Asp(tBu)-Phe-OEt

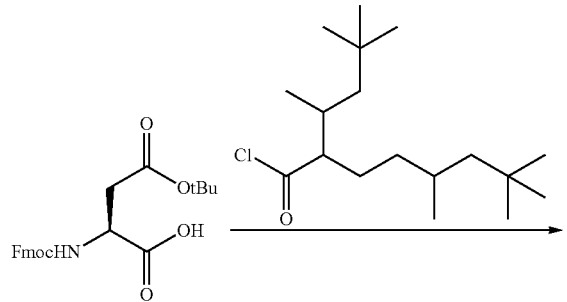

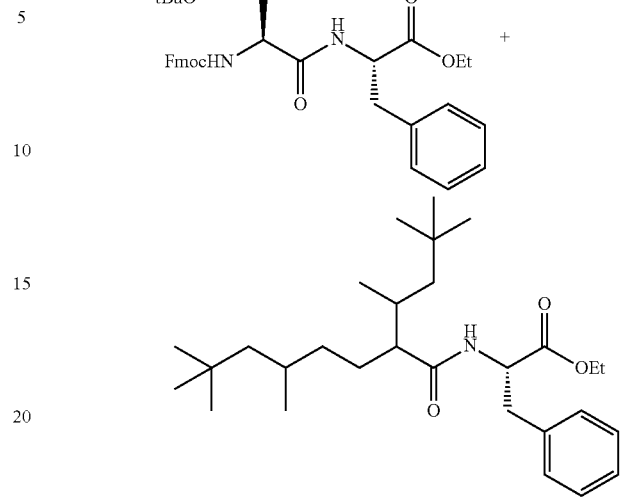

Fmoc-Asp(tBu)-OH (0.215 g, 0.522 mmol) and N,N-diisopropylethylamine (0.073 g, 0.566 mmol) were mixed with acetonitrile (2.2 mL), then, a 50% by mass toluene solution (0.29 g, 0.479 mmol) of ISTA-Cl was added thereto at 0° C. and the mixture was stirred for 3 hours. To the solution was added a solution prepared separately by mixing HCl·H-Phe-OEt (0.1 g, 0.435 mmol), N,N-diisopropylethylamine (0.068 g, 0.522 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Fmoc-Asp(tBu)-Phe-OEt (objective product) in the obtained organic layer was 99%, and the quantitative yield of ISTA-Phe-OEt (by-product) was 1%.

Fmoc-Asp(tBu)-Phe-OEt MASS (ESI+) m/z; 587.7 (M+H)+

Synthetic Example 16: Synthesis of Boc-Gly-Pro-OBn

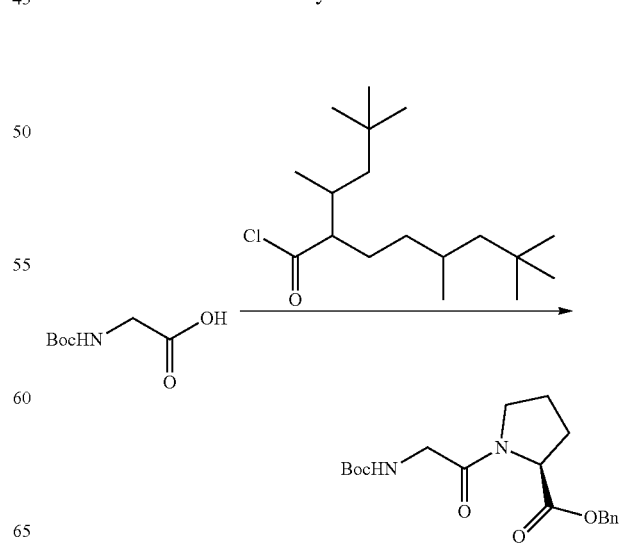

Boc-Gly-OH (0.086 g, 0.50 mmol) and N,N-diisopropylethylamine (0.070 g, 0.538 mmol) were mixed with acetonitrile (0.9 mL), then, a 50% by mass toluene solution (0.27 g, 0.456 mmol) of ISTA-Cl was added thereto at 0° C. and the mixture was stirred for 2 hours. To the solution was added a solution prepared separately by mixing HCl·H-Pro-OBn (0.1 g, 0.414 mmol), N,N-diisopropylethylamine (0.053 g, 0.50 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Boc-Gly-Pro-OBn (objective product) in the obtained organic layer was 91%.

Boc-Gly-Pro-OBn MASS (ESI+) m/z; 363.1 (M+H)+

Synthetic Example 17: Synthesis of Boc-Asp(tBu)-Leu-OMe

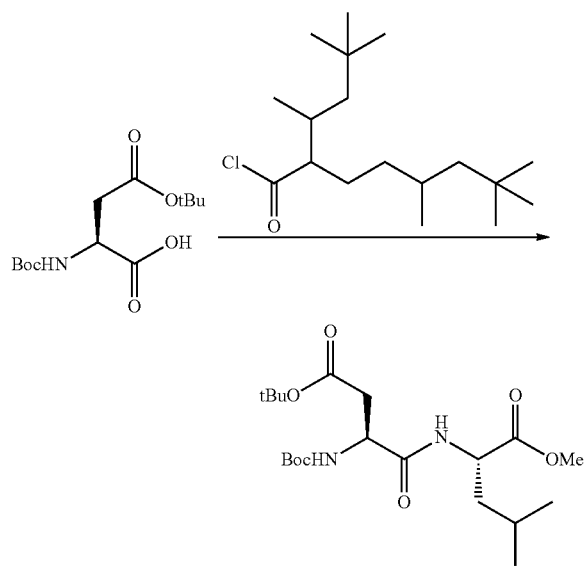

Boc-Asp(tBu)-OH (0.191 g, 0.66 mmol) and N,N-diisopropylethylamine (0.092 g, 0.715 mmol) were mixed with acetonitrile (2.0 mL), then, a 50% by mass toluene solution (0.367 g, 0.61 mmol) of ISTA-Cl was added thereto at 0° C. and the mixture was stirred for 2 hours. To the solution was added a solution prepared separately by mixing HCl·H-Leu-OMe (0.1 g, 0.55 mmol), N,N-diisopropylethylamine (0.085 g, 0.66 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Boc-Asp(tBu)-Leu-OMe (objective product) in the obtained organic layer was 99%.

Boc-Asp(tBu)-Leu-OMe MASS (ESI+) m/z; 417.1 (M+H)+

Synthetic Example 18: Synthesis of Boc-Tyr(tBu)-Orn(Boc)-OMe

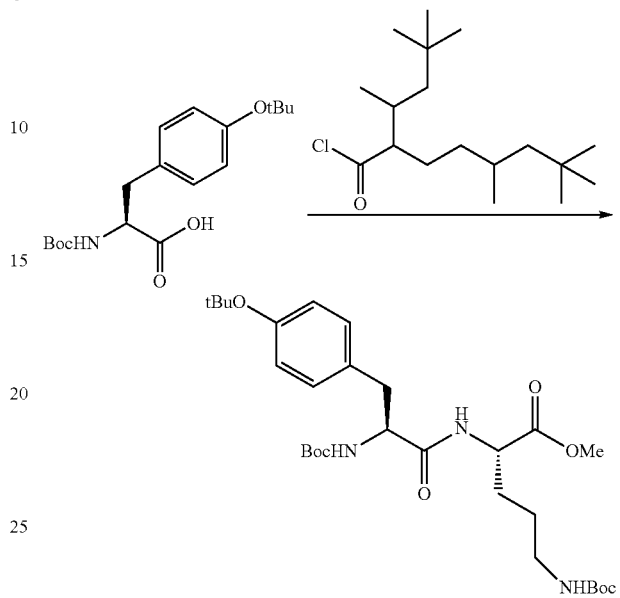

Boc-Tyr(tBu)-OH (0.142 g, 0.42 mmol) and N,N-diisopropylethylamine (0.059 g, 0.46 mmol) were mixed with acetonitrile (1.4 mL), then, a 50% by mass toluene solution (0.233 g, 0.39 mmol) of ISTA-Cl was added thereto at 0° C. and the mixture was stirred for 2 hours. To the solution was added a solution prepared separately by mixing HCl·H-Orn(Boc)-OMe (0.1 g, 0.35 mmol), N,N-diisopropylethylamine (0.054 g, 0.42 mmol) and acetonitrile (1.0 mL), and the resulting mixture was stirred for one hour. After diluting the obtained reaction mixture with ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (2.0 g), the quantitative yield of Boc-Tyr(tBu)-Orn(Boc)-OMe (objective product) in the obtained organic layer was 99%.

Boc-Tyr(tBu)-Orn(Boc)-OMe MASS (ESI+) m/z; 566.4 (M+H)+

Synthetic Example 19: Synthesis of Fmoc-Val-Phe-Phe-OEt

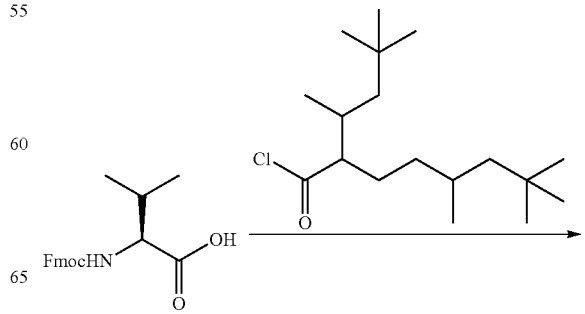

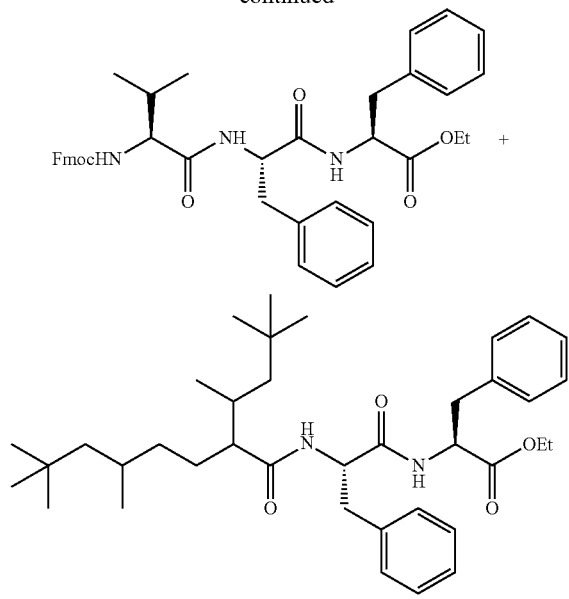

Fmoc-Val-OH (0.118 g, 0.348 mmol) and N,N-diisopropylethylamine (0.048 g, 0.377 mmol) were mixed with acetonitrile (1.2 mL), then, a 50% by mass toluene solution (0.193 g, 0.32 mmol) of ISTA-Cl was added thereto at 0° C. and the mixture was stirred for 3 hours. To the solution was added a solution prepared separately by mixing HCl·H-Phe-Phe-OEt (0.1 g, 0.29 mmol), N,N-diisopropylethylamine (0.045 g, 0.348 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (3.0 g), the quantitative yield of Fmoc-Val-Phe-Phe-OEt (objective product) in the obtained organic layer was 96%, and the quantitative yield of ISTA-Phe-Phe-OEt (by-product) was 1%.

Fmoc-Val-Phe-Phe-OEt MASS (ESI+) m/z; 662.4 (M+H)+

ISTA-Phe-Phe-OEt MASS (ESI+) m/z; 607.4 (M+H)+

Synthetic Example 20: Synthesis of Fmoc-Asp(tBu)-Phe-Phe-OEt

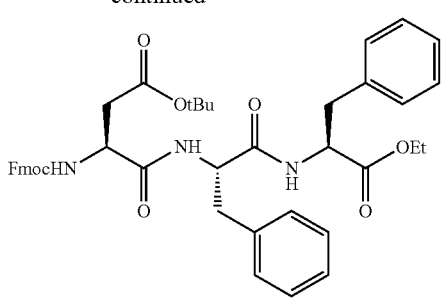

Fmoc-Asp(tBu)-OH (0.143 g, 0.348 mmol) and N,N-diisopropylethylamine (0.048 g, 0.377 mmol) were mixed with acetonitrile (1.4 mL), then, a 50% by mass toluene solution (0.193 g, 0.32 mmol) of ISTA-Cl was added thereto at 0° C. and the mixture was stirred for 3 hours. To the solution was added a solution prepared separately by mixing HCl·H-Phe-Phe-OEt (0.1 g, 0.29 mmol), N,N-diisopropylethylamine (0.045 g, 0.348 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (3.0 g), the quantitative yield of Fmoc-Asp(tBu)-Phe-Phe-OEt (objective product) in the obtained organic layer 94%.

Fmoc-Asp(tBu)-Phe-Phe-OEt MASS (ESI+) m/z; 734.4 (M+H)+

Synthetic Example 21: Synthesis of Fmoc-Trp(Boc)-Ala-Phe-OEt

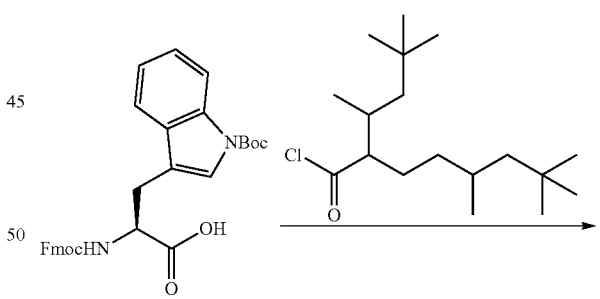

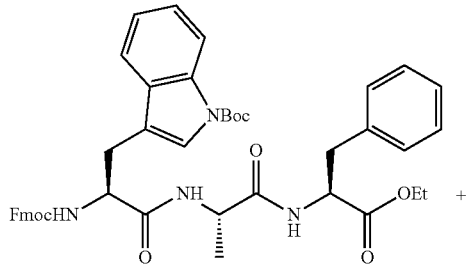

-continued

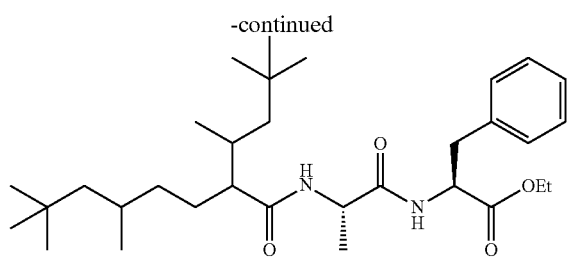

Fmoc-Trp(Boc)-OH (0.209 g, 0.40 mmol) and N,N-diisopropylethylamine (0.055 g, 0.43 mmol) were mixed with acetonitrile (2.1 mL), then, a 50% by mass toluene solution (0.220 g, 0.36 mmol) of ISTA-Cl was added thereto at 0° C. and the mixture was stirred for 3 hours. To the solution was added a solution prepared separately by mixing HCl·H-Ala-Phe-OEt (0.1 g, 0.33 mmol), N,N-diisopropylethylamine (0.051 g, 0.40 mmol) and acetonitrile (1.0 mL), and the resulting mixture was stirred for one hour. After diluting the obtained reaction mixture with tetrahydrofuran (3.0 g) and ethyl acetate (3.0 g), a saturated aqueous ammonium chloride solution (1.0 g) and water (1.0 g) were added thereto and liquid-separation was carried out. After subjecting the aqueous layer to liquid-separation again with ethyl acetate (3.0 g), the quantitative yield of Fmoc-Trp(Boc)-Ala-Phe-OEt (objective product) in the obtained organic layer was 97%, and the quantitative yield of ISTA-Ala-Phe-OEt (by-product) was 10%.

Fmoc-Trp(Boc)-Ala-Phe-OEt MASS (ESI+) m/z; 773.4 (M+H)+

ISTA-Ala-Phe-OEt MASS (ESI+) m/z; 531.3 (M+H)+

Synthetic Example 22: Synthesis of Boc-Val-Phe-OEt

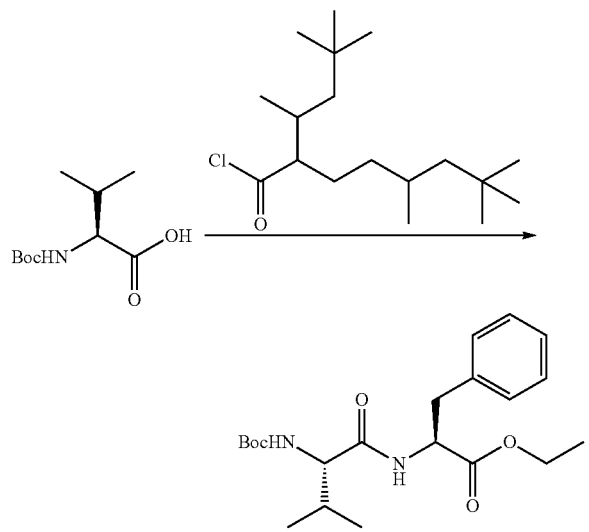

Boc-Val-OH (0.340 g, 1.56 mmol) and N,N-diisopropylethylamine (0.219 g, 1.69 mmol) were mixed with acetonitrile (3.4 mL), then, a 50% by mass toluene solution (0.870 g, 1.43 mmol) of ISTA-Cl was added thereto at 0° C. and the mixture was stirred for 3 hours. To the solution was added a solution prepared separately by mixing HCl·H-Phe-OEt (0.3 g, 1.3 mmol), N,N-diisopropylethylamine (0.203 g, 1.32 mmol) and acetonitrile (3.0 mL), and the resulting mixture was stirred for one hour. After diluting the obtained reaction mixture with ethyl acetate (6.0 g), a saturated aqueous ammonium chloride solution (3.0 g) and water (2.0 g) were added thereto and liquid-separation was carried out. After subjecting the aqueous layer to liquid-separation again with ethyl acetate (3.0 g), the obtained organic layer was concentrated and purified by silica gel column chromatography to obtain Boc-Val-Phe-OEt (0.49 g, yield 95%) as a white solid.

Boc-Val-Phe-OEt MASS (ESI+) m/z; 393.2 (M+H)+

Synthetic Example 23: Synthesis of Cbz-Val-Val-Phe-OEt

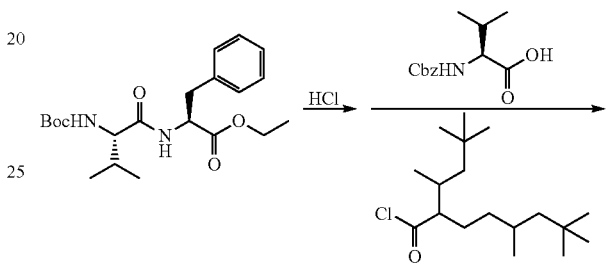

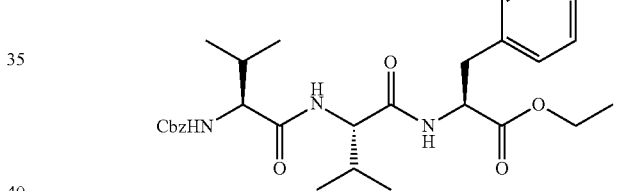

Boc-Val-Phe-OEt (0.20 g, 0.51 mmol) was mixed with 4M–HCl/1,4-dioxane (1.0 mL), and the mixture was stirred at 25° C. for 2 hours. The obtained reaction mixture was concentrated and the obtained HCl·H-Val-Phe-OEt as a white solid was used in the next step.

Cbz-Val-OH (0.154 g, 0.612 mmol) and N,N-diisopropylethylamine (0.086 g, 0.663 mmol) were mixed with acetonitrile (3.0 mL), then, a 50% by mass toluene solution (0.340 g, 0.561 mmol) of ISTA-Cl was added thereto at 0° C. and the mixture was stirred for 3 hours. To the solution was added a solution prepared separately by mixing HCl·H-Val-Phe-OEt (0.51 mmol), N,N-diisopropylethylamine (0.079 g, 0.612 mmol) and acetonitrile (2.0 mL), and the resulting mixture was stirred for one hour. After diluting the obtained reaction mixture with acetonitrile (4.0 g) and ethyl acetate (8.0 g), a saturated aqueous ammonium chloride solution (2.0 g) and water (2.0 g) were added thereto and liquid-separation was carried out. After subjecting the aqueous layer to liquid-separation again with ethyl acetate (5.0 g), it was dried over sodium sulfate and the obtained organic layer was concentrated to obtain a white solid. Ethyl acetate (4.0 g) was added to the obtained white solid, and the precipitated solid was collected by filtration to obtain Cbz-Val-Val-Phe-OEt (0.26 g, yield 97%) as a white solid.

Cbz-Val-Val-Phe-OEt MASS (ESI+) m/z; 526.7 (M+H)+

Synthetic Example 24: Synthesis of
Fmoc-Val-Val-Val-Phe-OEt

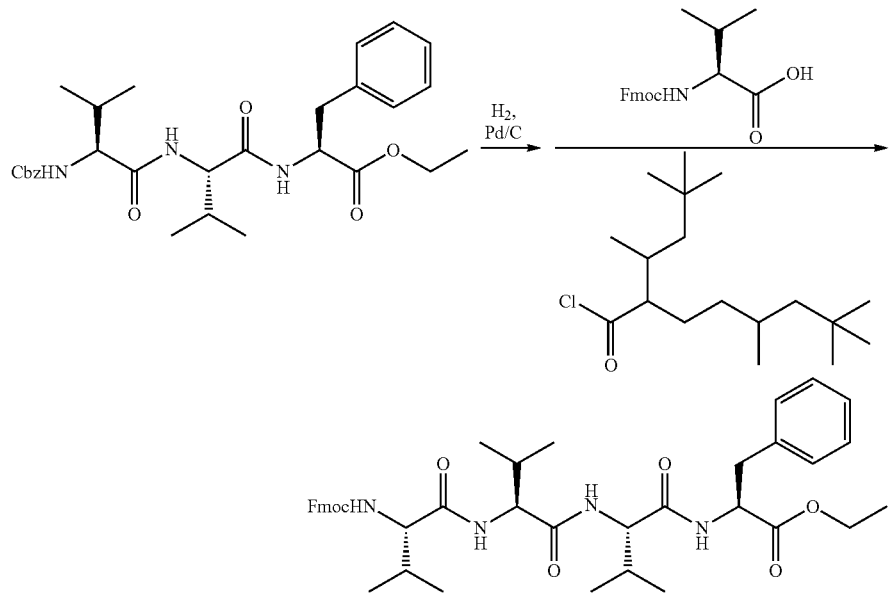

Cbz-Val-Val-Phe-OEt (0.10 g, 0.19 mmol) was dissolved in 2,2,2-trifluoroethanol (4 mL), and after adding 10% by mass Pd—C(20 mg) thereto, the mixture was stirred under hydrogen gas atmosphere at 25° C. for one hour. The reaction solution was filtered and concentrated, and the obtained H-Val-Val-Phe-OEt was used in the next step.

Fmoc-Val-OH (0.077 g, 0.228 mmol) and N,N-diisopropylethylamine (0.032 g, 0.247 mmol) were mixed with acetonitrile (0.77 mL), then, a 50% by mass toluene solution (0.127 g, 0.21 mmol) of ISTA-Cl was added thereto at 0° C. and the mixture was stirred for 3 hours. To the solution was added a solution prepared by mixing H-Val-Val-Phe-OEt (0.19 mmol) obtained in the previous step, acetonitrile (1.0 mL) and NMP (0.2 mL), and the resulting mixture was stirred for one hour. Diisopropyl ether (10 mL) was added to the obtained reaction solution, and the precipitated solid was collected by filtration to obtain Fmoc-Val-Val-Val-Phe-OEt (0.14 g, yield 103%) as a white solid.

Fmoc-Val-Val-Val-Phe-OEt MASS (ESI+) m/z; 713.4 (M+H)+

Synthetic Example 25: Synthesis of
Fmoc-Phe-Phe-OH (1) NMP (1.0 mL) was added to an H-Phe-2-ClTrt resin (109.9 mg, 0.1 mmol, available from Merck, the resin is polystyrene), and after stirring the mixture for 15 minutes, the solvent was removed.
(2) Fmoc-Phe-OH (155.0 mg, 0.4 mmol) and N,N-diisopropylethylamine (0.07 mL, 0.4 mmol) were dissolved in NMP (0.8 mL), and then, a 50% by mass toluene solution (0.24 mL, 0.4 mmol) of ISTA-Cl was added thereto at room temperature and the mixture was stirred for 3 hours.
(3) To the solution obtained in the above-mentioned (2) was added the solid obtained in the above-mentioned (1), and the mixture was stirred for one hour. After removing the reaction solvent, the obtained solid was washed successively by using NMP and methanol, and dried to obtain an Fmoc-Phe-Phe-2-ClTrt resin.
(4) To the whole amount of Fmoc-Phe-Phe-2-ClTrt resin obtained in the above-mentioned (3) was added acetic acid/2,2,2-trifluoroethanol/dichloromethane (volume ratio 1/2/7) (2 mL), and the mixture was stirred for 2 hours. After removing the desorbed resin by filtration, the reaction solution is concentrated under reduced pressure, diisopropyl ether was added to the residue and the precipitated solid was collected by filtration to obtain Fmoc-Phe-Phe-OH (51.4 mg, yield 96.1%) as a white solid.

Fmoc-Phe-Phe-OH MASS (ESI+) m/z; 535.3 (M+H)+

UTILIZABILITY IN INDUSTRY

According to the present invention, a producing method f a peptide with high efficiency can be provided.

The invention claimed is:
1. A method for producing a peptide which comprises the following steps (1) and (2):
(1) a step of mixing an N-protected amino acid or an N-protected peptide with a carboxylic acid halide represented by the formula (II)

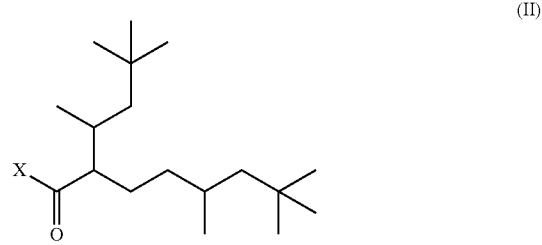

(II)

wherein
X represents a halogen atom, and
(2) a step of mixing the product obtained in the step (1) with a C-protected amino acid or a C-protected peptide.

2. The method for producing a peptide according to claim 1, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

3. The method for producing a peptide according to claim 1, wherein X is a chlorine atom or a bromine atom.

4. The method for producing a peptide according to claim 1, wherein X is a chlorine atom.

5. The method for producing a peptide according to claim 1, wherein the amino acid in the N-protected amino acid is an α-amino acid other than glycine.

6. The method for producing a peptide according to claim 5, wherein the amino acid in the N-protected amino acid is an α-amino acid other than glycine, and the reactive functional group at a side chain of the amino acid is protected.

7. The method for producing a peptide according to claim 5, wherein the α-amino acid other than glycine is valine, phenylalanine, threonine, leucine, tryptophan, serine, cysteine, aspartic acid or tyrosine.

8. The method for producing a peptide according to claim 1, wherein the amino acid in the C-protected amino acid or the amino acid in the N-terminal residue of the C-protected peptide is an α-amino acid other than an N-substituted amino acid.

9. The method for producing a peptide according to claim 1, wherein the step (2) is a step of mixing the product obtained in the step (1) and a C-protected peptide.

10. The method for producing a peptide according to claim 1, wherein the N-terminal protective group of the N-protected amino acid or the N-protected peptide is a carbamate-based protective group.

11. The method for producing a peptide according to claim 10, wherein the carbamate-based protective group is a 9-fluorenylmethyloxycarbonyl group or a benzyloxycarbonyl group.

12. The method for producing a peptide according to claim 3, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

13. The method for producing a peptide according to claim 4, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

14. The method for producing a peptide according to claim 5, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

15. The method for producing a peptide according to claim 6, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

16. The method for producing a peptide according to claim 7, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

17. The method for producing a peptide according to claim 8, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

18. The method for producing a peptide according to claim 9, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

19. The method for producing a peptide according to claim 10, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

20. The method for producing a peptide according to claim 11, which further comprises one or more repetitions of the following steps (3) to (5):
(3) a step of removing a protective group for an N-terminal of the peptide obtained in the step (2) or (5);
(4) a step of mixing an N-protected amino acid or an N-protected peptide with the carboxylic acid halide represented by the formula (II); and
(5) a step of mixing the product obtained in the step (4) and the product obtained in the step (3).

* * * * *